US006414909B1

(12) United States Patent
Shimizu et al.

(10) Patent No.: US 6,414,909 B1
(45) Date of Patent: Jul. 2, 2002

(54) ELECTRICALLY CONTROLLED MECHANICAL TIMEPIECE AND CONTROL METHOD THEREFOR

(75) Inventors: Eisaku Shimizu, Okaya; Kunio Koike; Hidenori Nakamura, both of Matsumoto, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/600,578

(22) PCT Filed: Oct. 5, 1999

(86) PCT No.: PCT/JP99/05488

§ 371 (c)(1), (2), (4) Date: Jul. 19, 2000

(87) PCT Pub. No.: WO00/31595

PCT Pub. Date: Jun. 2, 2000

(30) Foreign Application Priority Data

Nov. 19, 1998 (JP) .................................... 10-329463 (P)

(51) Int. Cl.[7] ............................ G04B 1/00; G04C 3/00; H02K 7/00

(52) U.S. Cl. ...................... 368/204; 310/75 A; 310/156

(58) Field of Search .......................... 368/64, 157, 160, 368/203, 204

(56) References Cited

U.S. PATENT DOCUMENTS 3,937,001 A 2/1976 Berney
4,376,992 A * 3/1983 Aizawa ...................... 368/156
4,382,692 A * 5/1983 Wiget et al. ................ 368/157
5,517,469 A * 5/1996 Wiget ......................... 368/157
5,615,178 A 3/1997 Takakura et al.
5,699,322 A * 12/1997 Born .......................... 368/203
5,740,131 A * 4/1998 Bernasconi ................. 368/204
5,751,666 A * 5/1998 Farine et al. ............... 368/204
5,838,456 A * 11/1998 Farine et al. ............... 368/204
6,021,097 A * 2/2000 Kanno et al. ................. 368/64
6,041,021 A * 3/2000 Shinkawa et al. .......... 368/204
6,097,675 A * 8/2000 Takahashi et al. ............ 368/64
6,208,119 B1 * 3/2001 Schafroth ................... 368/204
6,252,828 B1 * 6/2001 Shinkawa et al. .......... 368/204
6,314,059 B1 * 11/2001 Shimizu et al. ............. 368/157

FOREIGN PATENT DOCUMENTS

| | | |
|---|---|---|
| EP | 0 905 587 | 3/1999 |
| JP | 49-84680 | 8/1974 |
| JP | 50-6373 | 1/1975 |
| JP | 7-119812 | 5/1995 |
| JP | 8-50186 | 2/1996 |
| JP | 8-101284 | 4/1996 |
| JP | 11-101880 | 4/1999 |

* cited by examiner

*Primary Examiner*—Vit Miska
*Assistant Examiner*—Jeanne-Marguerite Goodwin
(74) *Attorney, Agent, or Firm*—Mark P. Watson

(57) ABSTRACT

An electronically controlled mechanical timepiece has first and second switches (121, 122) placed between an input terminal (22*a*) of a capacitor (22) and output terminals MG1 and MG2 of a generator (20), a third switch (130) placed between the output terminal MG1 and an input terminal (22*b*) of the capacitor (22), and a brake control circuit (55) enabled to control the switches independent of one another. Electric current is fed through the generator 20 by opening the switch (121) and closing the switches (122, 130). Thus, a rate measurement pulse is outputted therefrom. Consequently, rate measurement is easily achieved.

17 Claims, 16 Drawing Sheets

ELECTRICALLY CONTROLLED MECHANICAL TIMEPIECE AND CONTROL METHOD THEREFOR

BACKGROUND OF THE INVENTION

1. Technical Field

The present invention relates to an electronically controlled mechanical timepiece enabled to accurately drive time display instruments, such as hands, by using a generator to convert mechanical energy of a mechanical energy source, such as a spring, into electrical energy, and controlling the rotation cycle of the generator by operating a rotation control device by the electrical energy. The present invention also relates to a control method therefor. More particularly, the present invention relates to an electronically controlled mechanical timepiece enabled to reliably perform rate measurement, and a control method therefor.

2. Background Art

Electrical controlled mechanical timepieces described in Japanese Examined Patent Publication No. 7-119812 Official Gazette and Japanese Unexamined Patent Publication No. 8-50186 Official Gazettes are known as those each enabled to accurately drive hands fixed to a wheel train and to indicate time by using a generator to convert mechanical energy in an unwinding mode of a spring into electrical energy, and operating a rotation control device by the electrical energy to control the value of electric current flowing through a coil of the generator Meanwhile, in the case of an ordinary quartz timepiece driven by a button-type battery and a timepiece adapted to move hands by driving a motor by using electric power generated by the generator that is driven by a oscillating weight, rate measurement is performed by feeding electric current through a coil of the motor so as to measure the accuracy of the timepiece, and by receiving leakage magnetic flux generated at that time by a rate measuring device.

However, the electronically controlled mechanical timepiece has no motor for moving hands, so that rate measurement utilizing a motor cannot be performed. Applicants of the present application, thus, considered that another coil for rate measurement was provided therein. However, in this case, such a timepiece has drawbacks in that the size thereof is large and that the cost thereof increases.

OBJECTS OF THE INVENTION

A first object of the present invention is to provide an electronically controlled mechanical timepiece, which can perform rate measurement and reduce the size thereof and decrease the cost thereof, and to provide a control method therefor.

Further, in a conventional electronically controlled mechanical timepiece, a rotation control device constituted by ICs is operated by rectifying an AC output of a generator to direct current through a rectifier circuit. In such a case, usually, a bridge rectifier circuit using 4 diodes is used as the rectifier circuit. However, in such a bridge circuit, the diodes consume considerable electric power. Thus, the conventional electronically controlled mechanical timepiece has a drawback in that such a bridge circuit is unsuitable for a rectifier circuit to be used to rectify an AC output of a generator, which can generate only a small amount of electric power and is provided in a device, such as a timepiece.

To eliminate the drawbacks, the applicants of the present application developed a rectifier circuit that was suitable for an electronically controlled mechanical timepiece and that has first and second switches, each of which is provided between a corresponding one of two output terminals of a generator and a power storage device and is controlled according to the polarity of (or voltage level at) a corresponding one of the output terminals of the generator so that when one of the switches is closed, the other switch is opened, and the boosting can be performed by intermittently closing the opened switch at short time intervals, namely, by chopping.

When both the first and second switches are closed (namely, turned on) in this rectifier circuit, the AC output terminals of the generator are short-circuited. Thus, when each of the switches is turned on, short braking is caused in the generator. Moreover, energy is stored in the coil of the generator. Further, when one of the switches is opened (namely, turned off), the generator operates, and the energy stored in the coil results in an increase in the electromotive force or voltage.

Thus, the voltage level of an output signal at each of the AC output terminals can be raised. The output voltage of the rectifier circuit can be increased for that, as compared with the case that no chopping is performed. Consequently, the charging voltage in the case of charging a capacitor can be enhanced.

However, the electronically controlled mechanical timepiece, in which such a chopping rectifier circuit is incorporated, has another drawback in that although the charging efficiency is increased, rate measurement for checking the accuracy of the timepiece is difficult to perform.

That is, in the electronically controlled mechanical timepiece, the hands are operated in synchronization with the rotation of the rotor of the generator. It is, thus, considered that the rate measurement is performed by detecting magnetic variation caused by the rotation of the rotor.

However, in the electronically controlled mechanical timepiece, which undergoes a chopping control operation, a rate measurement device detects a chopping signal, which is generated by chopping, in addition to a magnetic variation signal generated by the rotation of the rotor. This presents the additional drawback in that the accurate rate measurement is difficult to perform.

A second object of the present invention is to provide an electronically controlled mechanical timepiece, which undergoes a chopping control operation and can easily perform rate measurement, and a control method therefor.

SUMMARY OF THE INVENTION

According to the present invention, there is provided an electronically controlled mechanical timepiece having a mechanical energy source, a generator, driven by the mechanical energy source, for generating an induced electromotive force and supplying electrical energy, a power supply circuit, into which the electrical energy is charged, and a rotation control device, driven by this power supply circuit, for controlling a rotation cycle of the generator. In this timepiece, a coil of the generator is used as a rate measuring coil.

When the coil of the generator is used as the rate measuring coil, there is no need to provide an additional rate measuring coil in the electronically controlled mechanical timepiece that has no motor for driving a time display device, such as hands, in addition to the generator. Thus, as compared with the case in which the rate measuring coil is added, the size of the electronically controlled mechanical timepiece can be reduced. Moreover, the cost thereof can be decreased.

At that time, preferably, the rotation control device ceases the power generation operation of the generator, for the predetermined time, by stopping the operation of controlling the rotation of the generator at constant cycles. Moreover, during that, the rate measurement is performed by feeding electric current from the power supply circuit through the coil of the generator.

With such a configuration, when the rate is measured, actually, leakage magnetic flux, which would be caused by performing an ordinary rotation control operation of the generator, is not generated. Only leakage flux for measuring the rate is generated by feeding electric current in the coil of the generator. Thus, the signal can be reliably and easily detected by a rate measuring device. The rate-measuring accuracy can be improved.

Further, the electronically controlled mechanical timepiece may have a first switch disposed between a first input terminal of the power supply circuit and a first output terminal of the generator, a second switch disposed between the first input terminal of the power supply circuit and a second output terminal of the generator, a third switch disposed between a second input terminal of the power supply circuit and the output terminal of the generator, and a brake control circuit enabled to control the switches independent of one another.

The electronically controlled mechanical timepiece of the present invention drives the hands and the generator by using the mechanical energy source, such as a spring. The number of rotations of the rotor, thus, that of rotation of each of the hands is controlled by applying a brake to the generator by using the brake control circuit of the rotation control device. At that time, in a state in which one of the first and second switches is closed, the brake control circuit performs the chopping control of the generator by opening and closing the other switch.

Incidentally, the brake control circuit can control the respective switches independent of each other. Thus, at constant cycles (for instance, at 1 second intervals), the second and third switches are closed for a predetermined time (for example, about 1 msec), and the first switch is opened (namely, turned off). Electric current is fed from the power supply circuit through the second and third switches into the coil of the generator by controlling the switches in this way. The rate measurement can be performed by measuring rate measuring pulses by means of a magnetic sensor of the rate measuring device in response to a change in a magnetic field generated by the coil when the electric current flows therethrough.

These rate measuring pulses correspond to the magnetic field generated by the electric current flowing through the coil in a short time. That is, these pulses are signals generated by an abrupt change in the electric current. Therefore, these pulses can be easily distinguished from the chopping signal. Consequently, the rate measurement can be reliably performed.

Incidentally, the first switch may comprise a first field effect transistor having a gate connected to the second output terminal of the generator, and a second field effect transistor connected in parallel with this first field effect transistor and adapted to be turned on and off by the brake control circuit. Moreover, the second switch may comprise a third field effect transistor having a gate connected to the first output terminal of the generator, and a fourth field effect transistor connected in parallel with this third field effect transistor and adapted to be turned on and off by the brake control circuit.

With such a configuration, for example, when the polarity at the first output terminal of the generator is positive (+), and the polarity at the second output terminal thereof is negative ((−), the electric potential is lower than that at the first output terminal), the first field effect transistor (in the case of Pch) having a gate connected to the second output terminal is in an on-state, while the third field effect transistor (in the case of Pch) having a gate connected to the first output terminal is in an off-state. Thus, an AC output signal outputted from the generator flows through a path from the first output terminal through the first field effect transistor, the power storage device, such as a capacitor, and the second AC output terminal. Consequently, the AC output signal is rectified.

Moreover, when the polarity at the second output terminal is positive, and the polarity at the first output terminal is negative (that is, lower in the electric potential than the level at the second output terminal), the third field effect transistor having a gate connected to the first output terminal is in an on-state, while the first field effect transistor having a gate connected to the second output terminal is in an off-state. Thus, the output signal is caused to flow in a path from the second output terminal, through the third field effect transistor, the power storage device, such as a capacitor, to the first output terminal.

At that time, each of the second and fourth field effect transistors is repeatedly turned on and off in response to the input of the chopping signals to the gate thereof. Moreover, the second and fourth field effect transistors are connected in parallel with the first and third field effect transistors. Thus, when the first and third field effect transistors are in an on-state, electric current flows therethrough regardless of the on-state and the off-state. However, when the first and third field effect transistors are in an off-state, electric current flows therethrough if the second and fourth field effect transistors are turned on by the chopping signals. Therefore, when the second and fourth field effect transistors are connected in parallel with one of the first and third field effect transistors, which are in an off-state, are turned on by a chopping signal, both the first and second switches are in an on-state. Thus, a closed loop is established among the AC output terminals. Incidentally, this closed loop may be constituted by connecting the AC output terminals through resistors. However, preferably, the closed loop is constituted by directly short-circuiting the AC output terminals. In the case that a resistor is interposed between the terminals, there is a concern that the output terminals are not close to the same potential at some resistance value, and that thus, no rate measuring pulses are outputted. However, the terminals can be reliably put at the same potential by short-circuiting the terminals. Thus, the rate measuring pulses can be reliably outputted.

Consequently, the voltage level of the AC output signal can be enhanced by chopping. A rectification control operation is performed in the first and third field effect transistors each having a gate connected to the AC output terminal. Thus, there is no necessity for using comparators. The configuration of the timepiece is simplified, so that the number of components is decreased. Moreover, the charging efficiency can be prevented from being lowered owing to the power consumption of the comparators. Furthermore, the turning-on or turning-off of the first and third field effect transistors is controlled by utilizing the voltage of the AC output terminal. Therefore, each of the field effect transistors is controlled in synchronization with the polarities at the AC output terminals. Consequently, the rectification efficiency can be enhanced.

Further, the electronically controlled mechanical timepiece may be configured so that a boosting circuit is connected to the third switch, and that when the third switch is closed, electric current boosted by the boosting circuit is supplied to the coil of the generator.

When the voltage level of the current signal flowing in the coil at the time of closing the third switch is raised to a high level by connecting the boosting circuit in series with the third switch, the signal level of the rate measuring pulses can be made to be considerably higher than that of the chopping signal. Thus, the rate measuring pulse can be more easily detected. Furthermore, the rate measurement can be more easily achieved.

Furthermore, preferably, the brake control circuit is adapted to open the first switch and close the third switch for a predetermined time (namely, a second set time), at constant cycles (for instance, 1 to 2 seconds), after establishing a closed loop among the output terminals of the generator by closing the first and second switches for a predetermined time (namely, a first set time).

Thus, even after the chopping control is canceled, electric current can be made to flow through the coil of the generator and rate measuring pulses can be outputted by opening the first switch and closing the third switch after the switches are once closed, so that short braking is applied by establishing a closed loop by short-circuiting the output terminals of the generator. Consequently, the rate measuring pulses are not superposed on the chopping signals. The rate measuring pulses can be reliably and easily detected.

Moreover, in the case that the switches are the first to fourth field effect transistors, preferably, the brake control circuit is adapted to turn off the second transistor and turn on the third transistor for a predetermined time (namely, a second set time), at constant cycles (for example, 1 to 2 seconds), after establishing a closed loop among the output terminals of the generator by turning on the second and fourth transistors for a predetermined time (namely, a first set time).

In the case that the second and fourth field effect transistors are controlled by the brake control circuit in this way in such a manner as to be simultaneously turned on, so that short braking is caused in the generator, the output terminals of the generator are at the same potential. Therefore, sufficient potential for turning on the transistors is not applied to the gates of the first and second transistors. Consequently, both the first and third transistors are turned off. Thus, the operations of the first and third transistors controlled in synchronization with the output terminal voltage of the generator are canceled by controlling the second and fourth transistors. Thereafter, the brake control circuit controls the on/off of the second and fourth transistors, so that the closing/opening of the first and second switches can be reliably controlled. Thus, the rate measuring pulses can be reliably outputted by controlling the third switch together therewith.

Incidentally, the brake control circuit may control the operation of the third switch only in the rate measuring mode that is set by putting in and pulling out the winding crown several times. Alternatively, the circuit may control the third switch during a steady operation thereof. Even when the third switch is operated during the steady operation, the time period (namely, the second set time), in which the third switch is closed, is very short. Thus, the rate measurement can be achieved without affecting the speed-governing control.

Further, in the electronically controlled mechanical timepiece, the brake control circuit may be adapted to be able to switch between a rate measuring mode and a hand moving mode, and adapted to establish a closed loop among the output terminals of the generator by turning on the second and fourth transistors for a predetermined time after canceling brake control applied to the generator by turning off the second and fourth field effect transistors for a predetermined time, and adapted to subsequently turn off the second transistor and close the third switch for a predetermined time.

Thus, the rate measuring mode is established in the timepiece. Then, the brake control of the generator is canceled, so that the generator is brought into a free running state. Subsequently, the rate measuring pulses are outputted. Consequently, no chopping signals are outputted in the rate measuring mode by performing the chopping control. Thus, the rate measuring pulses can be reliably detected. Moreover, the generator continues to operate, so that the charging of the power supply circuit can be continued even in the case that the rate measurement is performed for a long time. Furthermore, as a result of providing the rate measuring mode, the time period, in which the third switch is controlled, is limited to the rate measuring mode. In the hand moving mode, only the speed-governing control operation is performed. Thus, the speed-governing control operation can be efficiently performed. Moreover, the current consumption can be reduced by closing the third switch.

Moreover, preferably, the time period, during which a closed loop is formed among the output terminals of the generator, that is, the predetermined time (namely, the first set time), during which the first and second switches are closed, or the predetermined time (namely, the first set time), during which the second and fourth transistors are turned on, is set in such a manner as to be longer than a mask time, namely, a time period, in which the next magnetic pulse should not be detected, to be set when a magnetic pulse is inputted in a rate measuring device (namely, a quartz tester). Incidentally, the mask time is usually set at 70 to 80 msec (milliseconds), so that the predetermined time (namely, the first set time) is set at, for instance, a value, which is equal to or more than 70 msec and equal to or less than 200 msec, preferably, equal to or more than 80 msec (for example, 125 msec).

When a closed loop is formed among the output terminals of the generator by connecting the first and second switches or turning on the second and fourth transistors, magnetic pulses based on a change in the magnetic flux is generated in the case that the electromotive voltage at each of the output terminals is equal to or more than a predetermined value. The rate measuring device sets a predetermined time (for example, about 80 msec) and another predetermined time (namely, the mask time), in which the detection of magnetic pulses is not performed, when a magnetic pulse is inputted thereto, so as to prevent an erroneous detection due to external disturbance and to stably detect magnetic pulses. Therefore, in the case that the moment, at which an actual rate measuring pulse is generated, namely, the moment when the first switch is opened and the third switch is closed, or when the second transistor is turned off and the third switch is closed, is within the mask time, no rate measuring magnetic pulse is detected. In contrast, in the case that the time (namely, the first set time), in which a closed loop is established among the output terminals of the generator as described above, is set in such a way as to be longer than the mask time, the mask state is canceled when the closed-loop state is canceled and the third switch is closed and the rate measuring pulses are outputted. Thus, the rate measuring pulses can be reliably detected. Even when magnetic pulses other than the rate measuring pulses are outputted, the rate measurement can be reliably performed.

Incidentally, a very short time, for example, 0.2 to 1.0 msec or so is sufficient for the time (namely, the second set time), during which the third switch is closed, When this time period is short, an amount of electric current, which flows from the power storage device through the third switch and has an amount proportional to this time period, can be reduced.

Incidentally, it is preferable that the constant cycle, in which a closed loop is formed among the output terminals of the generator, is, for instance, 1 to 2 seconds. In the case that a light emitting diode (LED) adapted to blink at the time of detecting a magnetic pulse is provided in the rate measuring device, and that the constant cycle is 1 to 2 seconds, the LED also blinks at 1 to 2 second intervals. Thus, it is easy for an observer to check an operating state.

Further, preferably, the rotation control device is adapted to open the second switch or turn off the fourth transistor after a predetermined time (namely, a third set time), which is shorter than a mask time set when a magnetic pulse is inputted in the rate measuring device, elapses since the third switch is closed. This third set time is set at a value, which is, for instance, equal to or more than 60 msec and equal to or less than 90 msec, preferably, within a range of about 60 to 70 msec.

When the second switch is opened or the fourth transistor is turned off, a magnetic pulse is generated in the case that the electromotive voltage at the output terminal of the generator is equal to or more than the predetermined value. At that time, in the case that the moment, at which this magnetic pulse is generated, since the generation of the rate measuring pulse is set in such a manner as to be within the mask time, this magnetic pulse is not detected. Consequently, the rate measurement can be reliably performed.

Furthermore, the electronically controlled mechanical timepiece according to the present invention may be configured so that the rotation control device has a rotation stopping device for mechanically stopping a rotation of the generator, and that the operating mode is able to switch between a rate measuring mode and a hand moving mode, and that the first switch is opened and the second switch is closed and the third switch is closed for a predetermined time, in a rate measuring mode, after the rotation stopping device stops rotation of the generator.

In the case that the rotation control device has a rotation stopping device, the rate measurement can be performed by closing the third switch in a state, in which the rotation of the rotor is stopped. In this case, the rotor stops. Thus, there is no need for the chopping control. The timepiece is configured so that when the rate measurement is performed, only the rate measurement pulses are outputted. Consequently, the rate measurement is more reliably performed.

Further, according to the present invention, there is provided a method for controlling an electronically controlled mechanical timepiece having a mechanical energy source, a generator, driven by the mechanical energy source, for generating an induced electromotive force and supplying electrical energy, a power supply circuit, into which the electrical energy is charged, and a rotation control device, driven by this power supply circuit, for controlling a rotation cycle of the generator. In the case of this method, rate measurement is performed by feeding electric current through a coil of the generator at constant cycles.

According to such a method of the present invention, the rate measurement can be performed by feeding the electric current in the coil of the generator. Thus, there is no necessity for adding a rate measuring coil in the timepiece. Consequently, the size of the electronically controlled mechanical timepiece can be reduced. Moreover, the cost thereof can be decreased.

At that time, preferably, an operation of controlling a rotation of the generator is stopped at constant cycles. Furthermore, when the operation of controlling the rotation of the generator is stopped, rate measurement is performed by feeding electric current through the coil of the generator.

According to such a control method, the rate measurement is performed by feeding electric current in the coil of the generator when the rotation control operation of the generator is stopped. Thus, a signal caused by the rotation control of the generator is not superposed on a hand moving signal, such as leakage flux at the time of rate measurement. Consequently, the rate measurement can be reliably and easily performed.

Moreover, the method for controlling an electronically controlled mechanical timepiece may be adapted so that the timepiece further comprises a first switch disposed between a first input terminal of the power supply circuit and a first output terminal of the generator, a second switch disposed between the first input terminal of the power supply circuit and a second output terminal of the generator, and a third switch disposed between a second input terminal of the power supply circuit and the output terminal of the generator, and that the brake control circuit opens the first switch and closes the third switch for a predetermined time, at constant cycles, after establishing a closed loop among the output terminals of the generator by closing the first and second switches for a predetermined time.

Furthermore, the method for controlling an electronically controlled mechanical timepiece may be adapted so that the brake control circuit is adapted to be able to switch between a rate measuring mode and a hand moving mode, and adapted to establish a closed loop among the output terminals of the generator by turning on the second and fourth transistors for a predetermined time after canceling brake control applied to the generator by turning off the second and fourth field effect transistors for a predetermined time, and adapted to subsequently turn off the second transistor and close the third switch for a predetermined time.

Further, the method for controlling an electronically controlled mechanical timepiece may be adapted so that the brake control circuit is adapted to be able to switch between a rate measuring mode and a hand moving mode. In the rate measuring mode, after the rotation of the rotor of the generator is stopped by the rotation stopping device, at constant cycles, the first switch is opened, and the second and third switches are closed for a predetermined time, so that electric current is fed from the power supply circuit through the coil of the generator for the predetermined time.

According to each of these control methods, electric current can be fed from the power supply circuit through the coil of the generator, and a rate measuring pulse can be outputted by controlling each of the switches. Thus, the rate measurement can be reliably performed.

Furthermore, in the case that the rate measuring mode is provided therein, each of the switches can be controlled in such a way as to facilitate the rate measurement in the rate measuring mode. Thus, the rate measurement can be performed more easily and reliably.

DETAILED DESCRIPTION

Hereinafter, embodiments of the present invention will be described with reference to the accompanying drawings.

Figure 1:
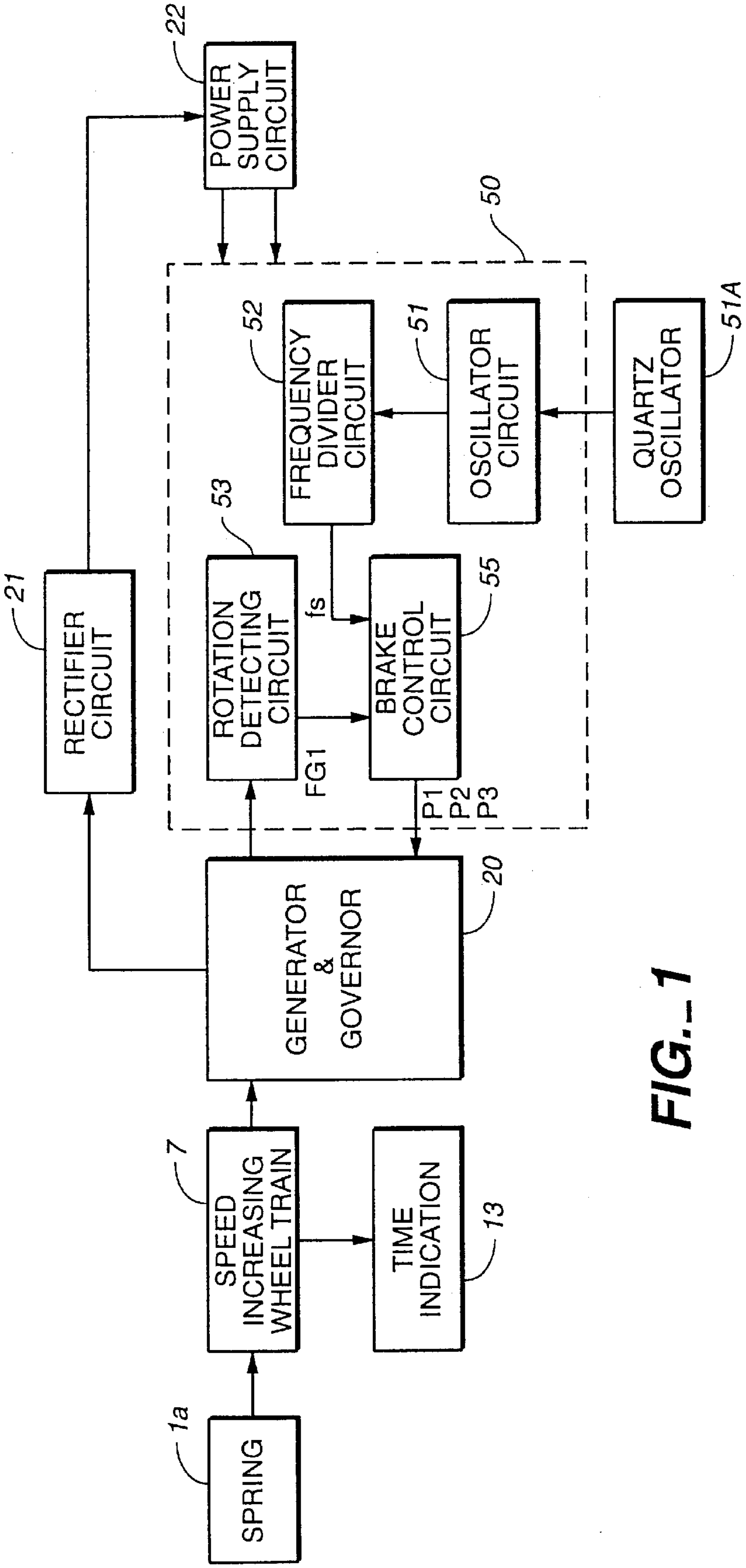
FIG. 1 is a block diagram illustrating the configuration of an electronically controlled mechanical timepiece, which is a first embodiment of the present invention.

FIG. 1 is a block diagram illustrating the configuration of an electronically controlled mechanical timepiece, which is a first embodiment of the present invention.

The electronically controlled mechanical timepiece has a spring 1*a* serving as a mechanical energy source, speed-increasing wheel train (wheel and pinion) 7 serving as a mechanical energy transmitting device for transmitting the torque of the spring 1*a* to a generator 20, and hands 13 serving as a time indication device, connected to the speed-increasing wheel train 7, for displaying time.

The generator 20 is driven by the spring 1*a* through the speed-increasing wheel train 7, and generates an induced electromotive force and supplies electric energy. AC output voltages of this generator 20 are boosted and rectified through a rectifier circuit 21 having the functions of boosting rectification, full-wave rectification, half-wave rectification, and transistor rectification, and are charged into and supplied to a capacitor (namely, a power supply circuit) 22.

Figure 2:
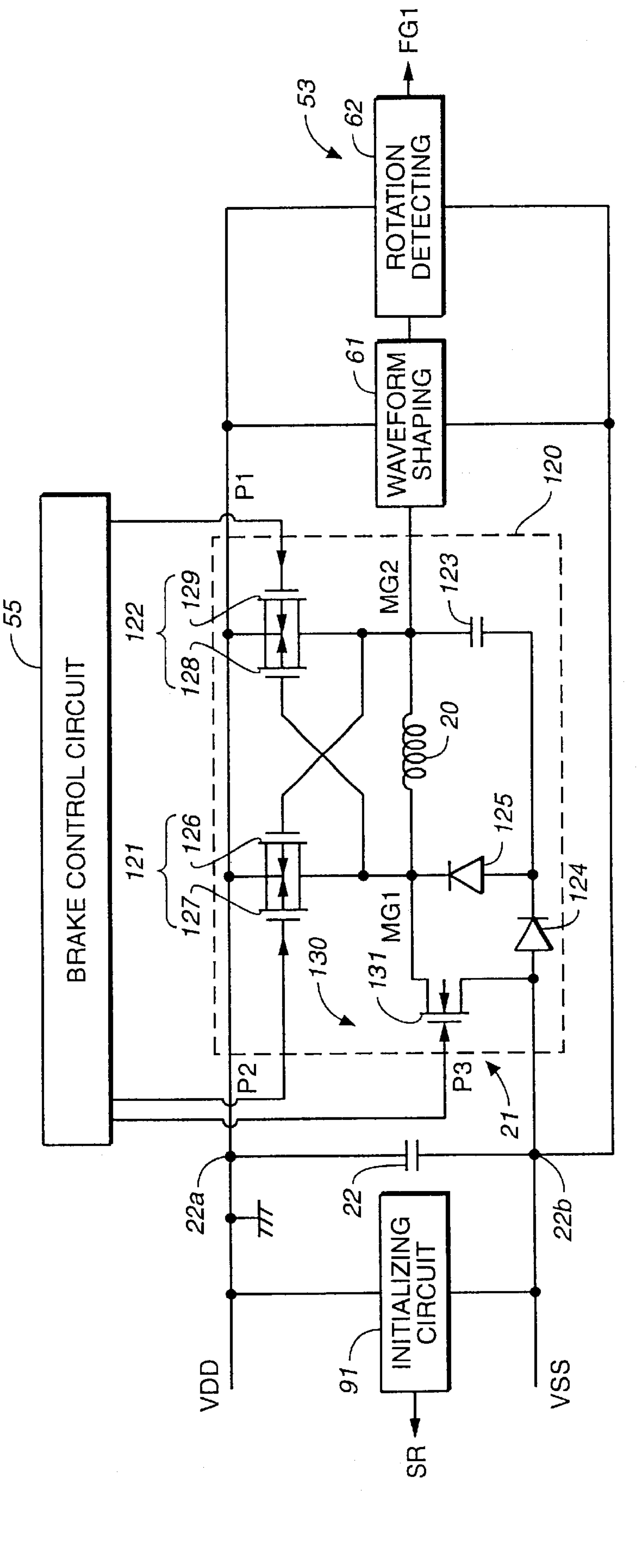
FIG. 2 is a circuit diagram illustrating the configuration of a primary part of the first embodiment.

A rotation control unit 50 is driven by electric power supplied from this capacitor 22, and performs the speed-governing and controlling of the generator 20. The rotation control unit 50 comprises an oscillator circuit 51, a frequency dividing circuit 52, a circuit 53 for detecting the rotation of the rotor, and a brake control circuit 55 for controlling a brake. As illustrated in FIG. 2, the speed governing of the generator 20 is performed by controlling a brake circuit 120.

The brake circuit 120 comprises first and second switches 121 and 122 for causing short braking by establishing a closed loop, for example, by short-circuiting the first output terminal MG1 and the second output terminal MG2, from each of which an AC signal (namely, an AC current) generated by the generator 20 is outputted. The brake circuit 120 is incorporated into the generator 20 also serving as a speed governor.

The first switch 121 comprises a first Pch (namely, P-channel) field effect transistor (FET) 126 having a gate connected to the second output terminal MG2, and a second Pch FET 127 having a gate, to which a chopping signal (or pulse) P2 is inputted from the brake control circuit 55, by connecting these FETs in parallel with each other. The first switch 121 is placed between the first output terminal MG1 and the first input terminal 22*a* of the capacitor 22.

Further, the second switch 122 is configured so that the Pch third field effect transistor (FET) 128 having a gate connected to the first output terminal, and the Pch fourth field effect transistor 129 having a gate, to which a chopping signal (or chopping pulse) P1 is inputted, and that these field effect transistors (FETs) 128 and 129 are connected in parallel with each other. Similarly as in the case of the switch 121, the second switch 122 is placed between the second output terminal MG2 and the first input terminal 22*a* of the capacitor 22.

A boosting capacitor 123, diodes 124 and 125 are placed between the second input terminal 22*b* of the capacitor 22 and each of the output terminals MG1 and MG2 of the generator 20.

A voltage doubler rectifier circuit (that is, a simplified synchronous boost chopping rectifier circuit) 21 (corresponding to the rectifier circuit 21) comprises the boosting capacitor 123, the diodes 124, 125, the first switch 121, and the second switch 122, which are connected to the generator 20. Further, a DC signal rectified by this rectifier circuit 21 is charged in the capacitor 22 through the input terminals 22*a* and 22*b* thereof.

Incidentally, whatever the kind may be, the diodes 124 and 125 may be one-way elements adapted to pass the current in a direction. Especially, the generator of the electrically controlled mechanical timepiece has a low electromotive voltage. Therefore, preferably, a Schottky barrier diode providing a small voltage drop Vf is used as the diode 125. Furthermore, preferably, a silicon diode providing a counter-flow leakage current is used as the diode 124.

Furthermore, a third switch 130 is provided between the first output terminal MG1 of the generator 20 and the second input terminal 22*b* of the capacitor 22. This third switch 130 is constituted by the Nch field effect transistor 131 placed between the first output terminal MG1 and the second input terminal 22*b* of the capacitor 22. The turning-on and turning-off of the Nch field effect transistor 131 is controlled by the chopping signal P3 inputted from the brake control circuit 55.

Figure 3:
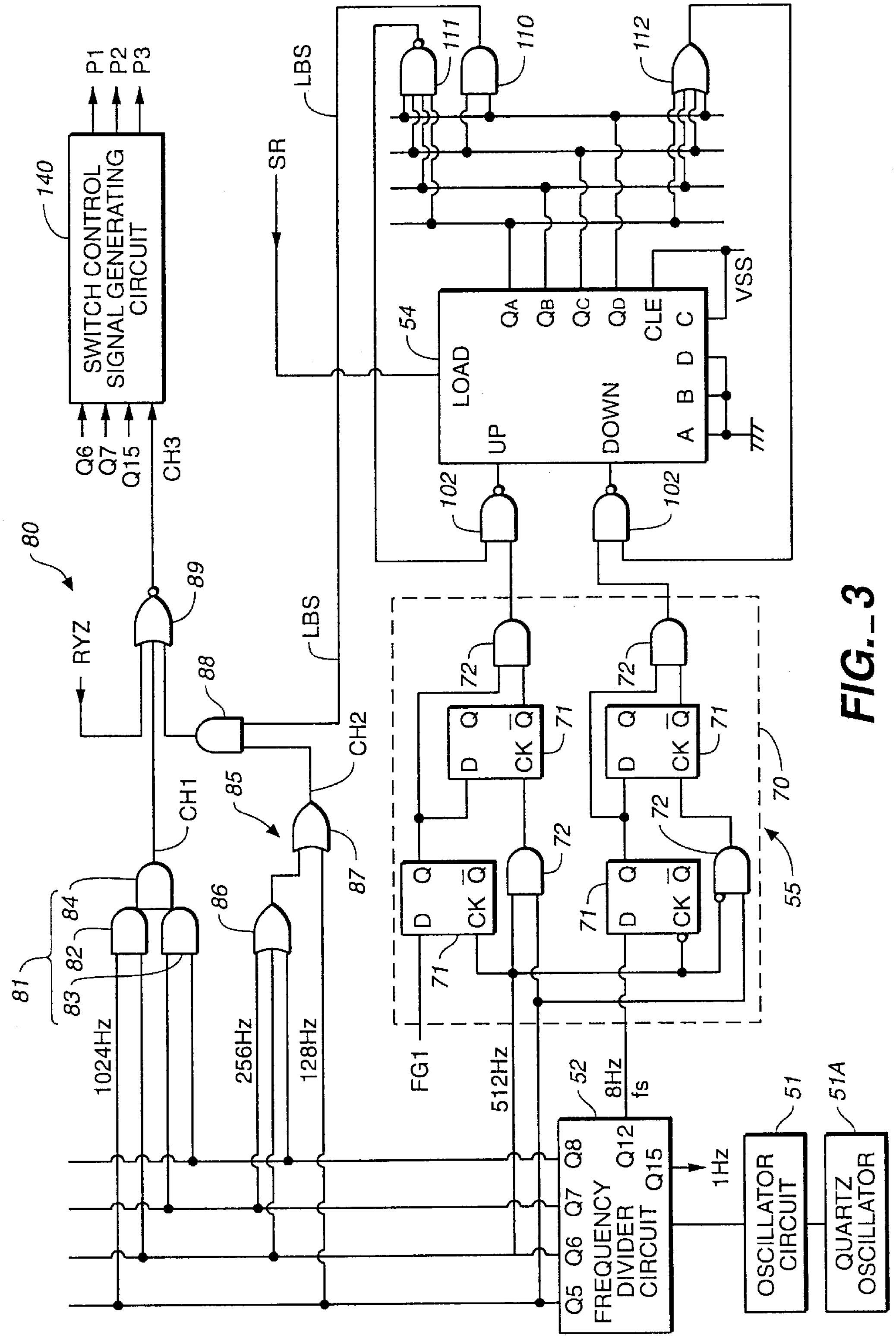
FIG. 3 is a circuit diagram illustrating the configuration of a brake control circuit of the first embodiment.

The oscillator circuit 51 of the rotation control device 50 is operative to output oscillation signals (32768 Hz) by using a quartz oscillator 51A, which serves as a time standard, as illustrated in FIG. 3. This oscillation signal is frequency-divided by a frequency-divider circuit 52 consisting of 15-stages of flip-flops in such a way as to have a certain constant cycle. An output Q12 of the twelfth stage of the frequency divider circuit 52 is outputted as a reference signal fs having a frequency of 8 Hz. Incidentally, reference characters Q5, Q6, Q8, and Q15 designate an output signal having a frequency of 1024 Hz, an output signal having a frequency of 512 Hz, a frequency of 256 Hz, an output signal having a frequency of 128 Hz, and respectively.

The rotation detecting circuit 53 comprises a waveform shaping circuit 61 connected to the generator 20, and a mono-multi vibrator 62. (FIG. 2) The waveform shaping circuit 61 comprises an amplifier and a comparator, and converts a sinusoidal wave to a rectangular wave. The mono-multi vibrator 62 serves as a band-pass filter that allows only pulses whose frequencies are equal to or less than a predetermined cycle, and outputs a rotation detection signal FG1, from which noises are removed.

The brake control circuit 55 has an up/down counter 54, a synchronization circuit 70, a chopping signal generating portion 80, and a switch control signal generating circuit 140. (FIG. 3)

A rotation detection signal FG1 outputted from the rotation detecting circuit 53 and a reference signal fs outputted from the frequency divider circuit 52 are inputted through the synchronization circuit 70 to an up-counting input terminal and a down-counting input terminal of the up/down counter 54, respectively.

The synchronization circuit 70 comprises four flip-flops 71, and an AND gate 72, as illustrated in FIG. 3, and synchronizes the rotation detection signal FG1 with the reference signal fs (8 Hz) by utilizing an output (1024 Hz) of the fifth stage of the frequency divider circuit 52, and an output (512 Hz) of the sixth stage thereof. The circuit 70 performs a control operation so as to prevent these signal pulses from being outputted by being superposed.

The up/down counter 54 is constituted by a 4-bit counter, and has an up-counting input terminal, to which a signal based on the rotation detection signal FG1 is inputted from the synchronization circuit 70, and has a down-counting input terminal, to which a signal based on the reference signal fs is inputted from the synchronization circuit 70. Thus, the counting of the reference signal fs and the rotation detection signal FG1 is performed simultaneously with the calculation of the difference therebetween.

Incidentally, four data input terminals (namely, preset terminals) A to D are provided to this up/down counter 54. Further, signals whose signal level is an H level, are inputted to the terminals A, B, and D. The counter value "11" is set as an initial value (namely, a preset value) of the up/down counter 54.

Further, an initializing circuit 91, (FIG. 2) which is connected to the capacitor 22, for outputting a system reset signal SR at the time of first supplying electric power to the capacitor 22 is connected to a LOAD input terminal of the up/down counter 54. Incidentally, in this embodiment, the initializing circuit 91 outputs a signal having an H level until the charging voltage of the capacitor 22 reaches a predetermined voltage. When the charging voltage is higher than the predetermined voltage, the initializing circuit 91 outputs a signal having an L level.

The up/down counter 54 does not accept an up/down input until the level of the reset signal SR becomes an L level. Thus, the count value of the up/down counter 54 is maintained at "11".

The up/down counter 54 has 4-bit outputs QA to QD. Therefore, in the case that the count value is equal to or more than "12", a signal, whose signal level is an L level, is surely outputted from at least one of an output terminal corresponding to a third bit QC and an output terminal corresponding to a fourth bit QD.

Therefore, when the count value of the up/down counter 54 is equal to or more than "12", the signal level of an output signal outputted from an output terminal LBS, to which the output signals QC and QD are inputted, of the AND gate 110 is an H level. If the count value is equal to or less than "11", the output signal from the output terminal LBS is connected to the chopping signal generating portion 80.

Incidentally, output signals of the NAND gate 111 and the OR gate 112 are inputted to the NAND gates 102 to which outputs of the synchronization circuit 70 are inputted. Therefore, a plurality of successive input up-counting signals are inputted thereto, so that the count value reaches "15". At that time, a signal, whose signal level is an L level, is outputted from the NAND gate 111. Further, the NAND gate 102 is adapted so that when an up-counting signal is inputted to the NAND gate 102, this input signal is canceled, and additional up-counting signals are not further inputted thereto. Similarly, when the count value is "0", a signal having an L level is outputted from the OR gate 112. Thus, an input of a down-counting signal is canceled. Consequently, this gate is adapted so that when the count value exceeds "15", the count value is prevented from being changed to "0", and vice versa.

The chopping signal generating portion 80 comprises a first chopping signal generator 81, which comprises three AND gates 82 to 84, for outputting a first chopping signal CH1 by utilizing output signals Q5 to Q8 of the frequency divider circuit 52, a second chopping signal generator 85, which comprises two OR gates 86 and 87, for outputting a second chopping signal CH2 by utilizing the outputs Q5 to Q8 of the frequency divider 52, an AND gate 88 to which an output LBS of the up/down counter 54 and the output CH2 of the second chopping signal generator 85 are inputted, and a NOR gate 89 to which an output of this AND gate 88, the output CH1 of the first chopping signal generator 81, and a signal RYZ based on the operation of the crown are inputted.

Incidentally, in an ordinary hand moving mode, the signal RYZ is made to have an L level. Conversely, in a rate measuring mode (namely, in a hand adjusting mode), when the crown in pulled out, or when the crown is pushed in and pulled out several times, or when a special button is manipulated, the signal RYZ is made to have an H level.

Figure 5:
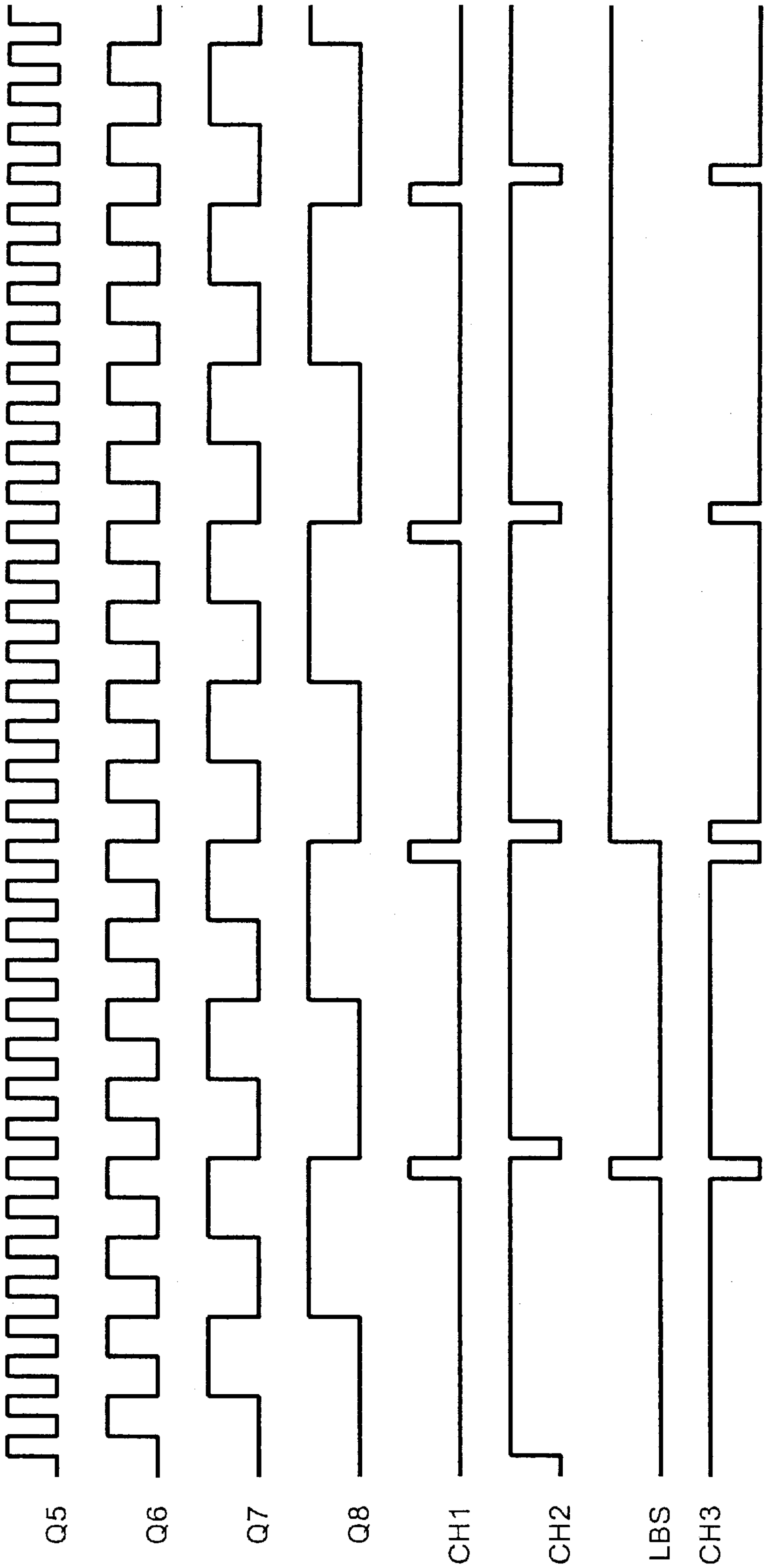
FIG. 5 is a timing chart illustrating another operation of the first embodiment.

Therefore, an output signal CH3 of the NOR gate 89 of the chopping signal generating portion 80 always has an L-level when the signal RYZ has an H-level, regardless of the other output CH1 and an output of the NAD gate 88. In contrast, when the signal RYZ has an L level, the output CH3 is changed by the output CH1 and the output of the AND gate 88, as illustrated in FIG. 5.

This output signal CH3 is inputted to a switch control signal generating circuit 140. The output pulse signals Q15 (1 Hz), Q7 (256 Hz), Q6 (512 Hz) of the frequency divider 52 are inputted to this switch control signal generating circuit 140.

Figure 6:
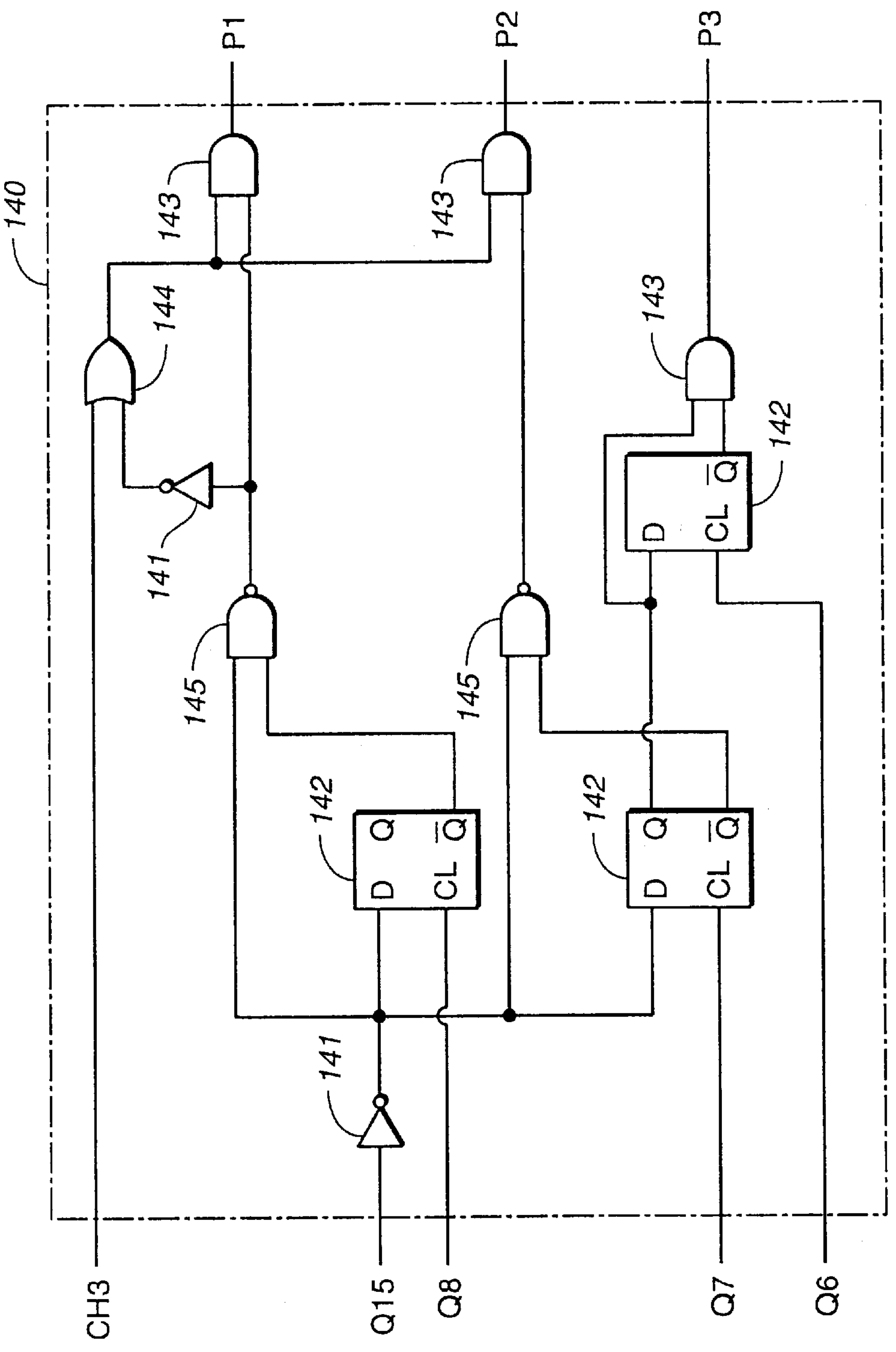
FIG. 6 is a circuit diagram illustrating the configuration of a switch control signal generating circuit of the first embodiment.

The switch control signal generating circuit 140 is constituted by a combination of inverter gates 141, flip-flops 142, AND gates 143, OR gates 144, and NAND gates 145 as illustrated in FIG. 6.

Figure 7:
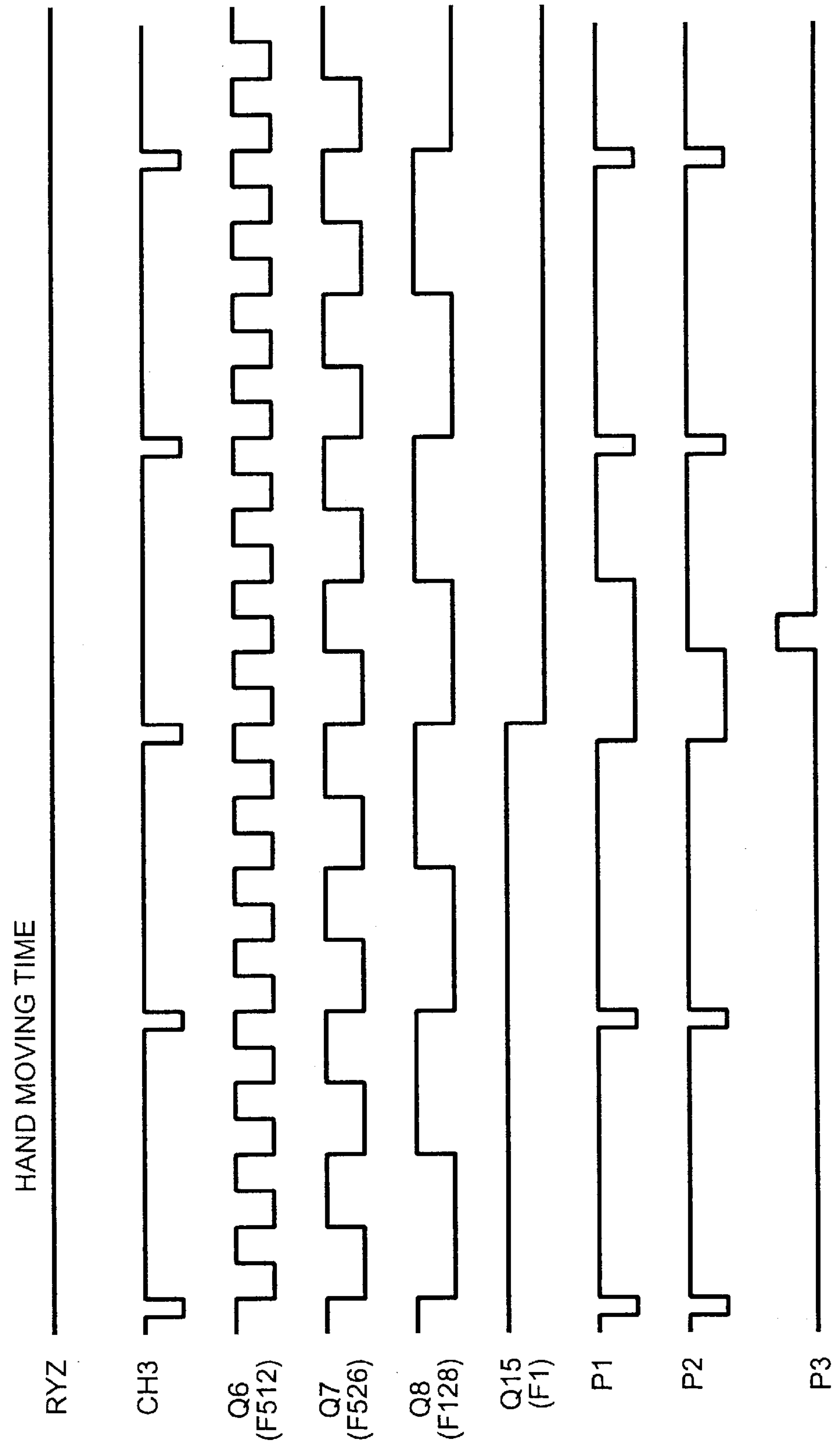
FIG. 7 is a timing chart illustrating an operation of the first embodiment in a hand moving mode.
Figure 8:
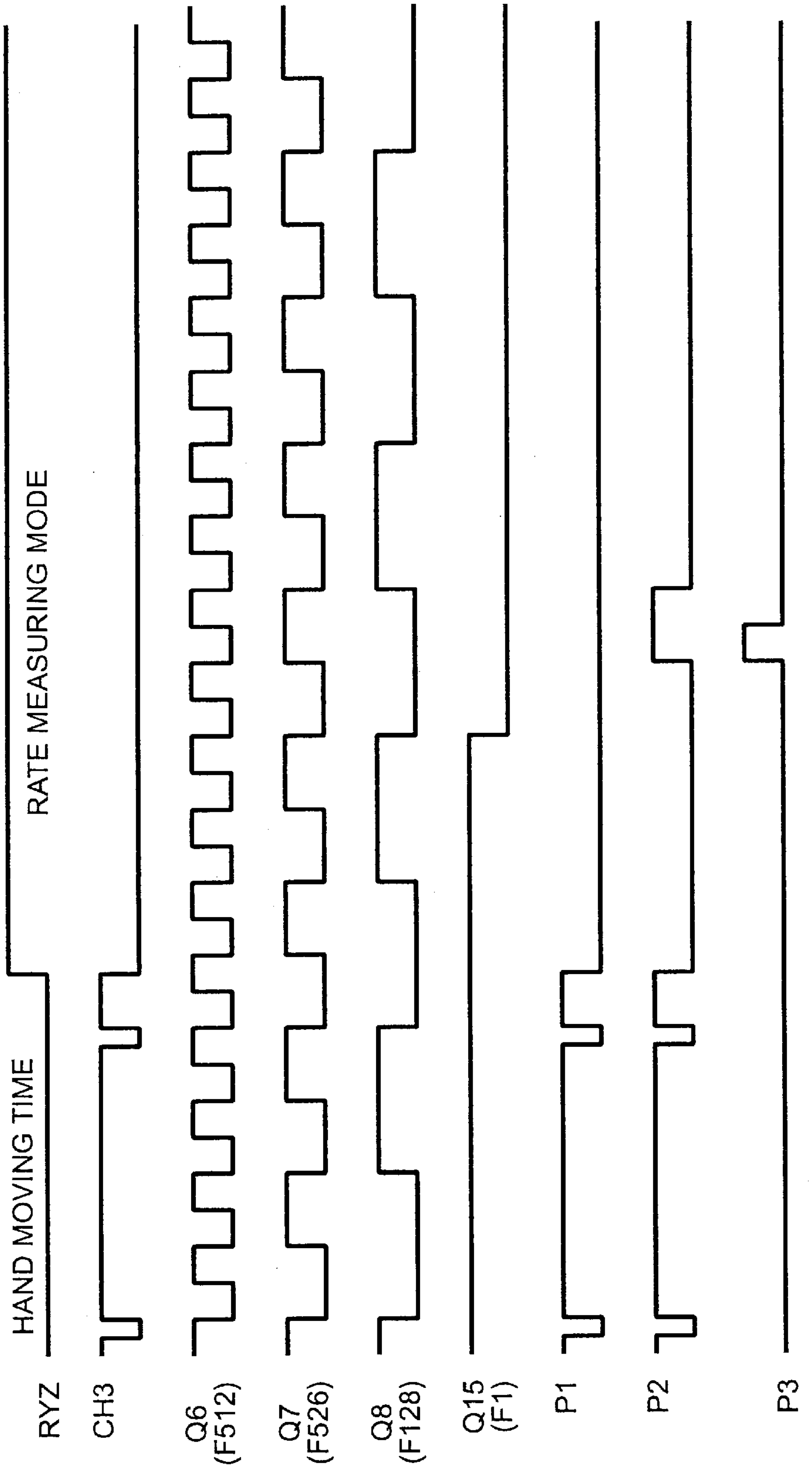
FIG. 8 is a timing chart illustrating an operation of the first embodiment in a rate mode.

This switch control signal generating circuit 140 outputs signals P1, P2, and P3, based on the input signals, as illustrated FIGS. 7 and 8. That is, usually, a chopping pulse signal, which is the same as the output signal CH3, is outputted from each of the output terminals P1 and P2. A signal, whose signal level is an L level, is outputted from the output terminal P3. Further, when the signal level of the output signal Q15 changes from an H level to an L level, that is, at 1-Hz cycles, the output signals P1 and P2 maintain the signal levels at an L level. Moreover, after a predetermined number of cycles, a signal having an H level is outputted from each of the terminals P2 and P3. Incidentally, in the case of this embodiment, the time required to change the signal level of the output signal P2 from an L level to an H level is equal to one cycle of the signal Q6, that is, 1/512=about 1.9 msec. The duration of the signal having an H level is half the cycle of the signal Q6, that is, 1/1024=about 1 msec.

These signals P1 to P3 are inputted to the transistors 127, 129, 131. (FIG. 2) Thus, when a signal having an L level is outputted from each of the output terminals P1 and P2, the transistors 127 and 129, thus, the switches 121 and 122 are maintained in an on-state. Thus, the generator 20 is short-circuited, and short braking is applied thereto.

On the other hand, when signals each having an H level are outputted from both the output terminals P1 and P2, the switches 121 and 122 are maintained in an off-state, so that no brake is applied to the generator 20. Therefore, the chopping control operation is performed on the generator 20 by using the output signals P1 and P2.

Further, when a signal having an L level is outputted from the output terminal P3, the transistor 131, thus, the third switch 130 is maintained in an off-state. When a signal having an H level is outputted therefrom, the third switch 130 is maintained in an on-state.

Figure 9:
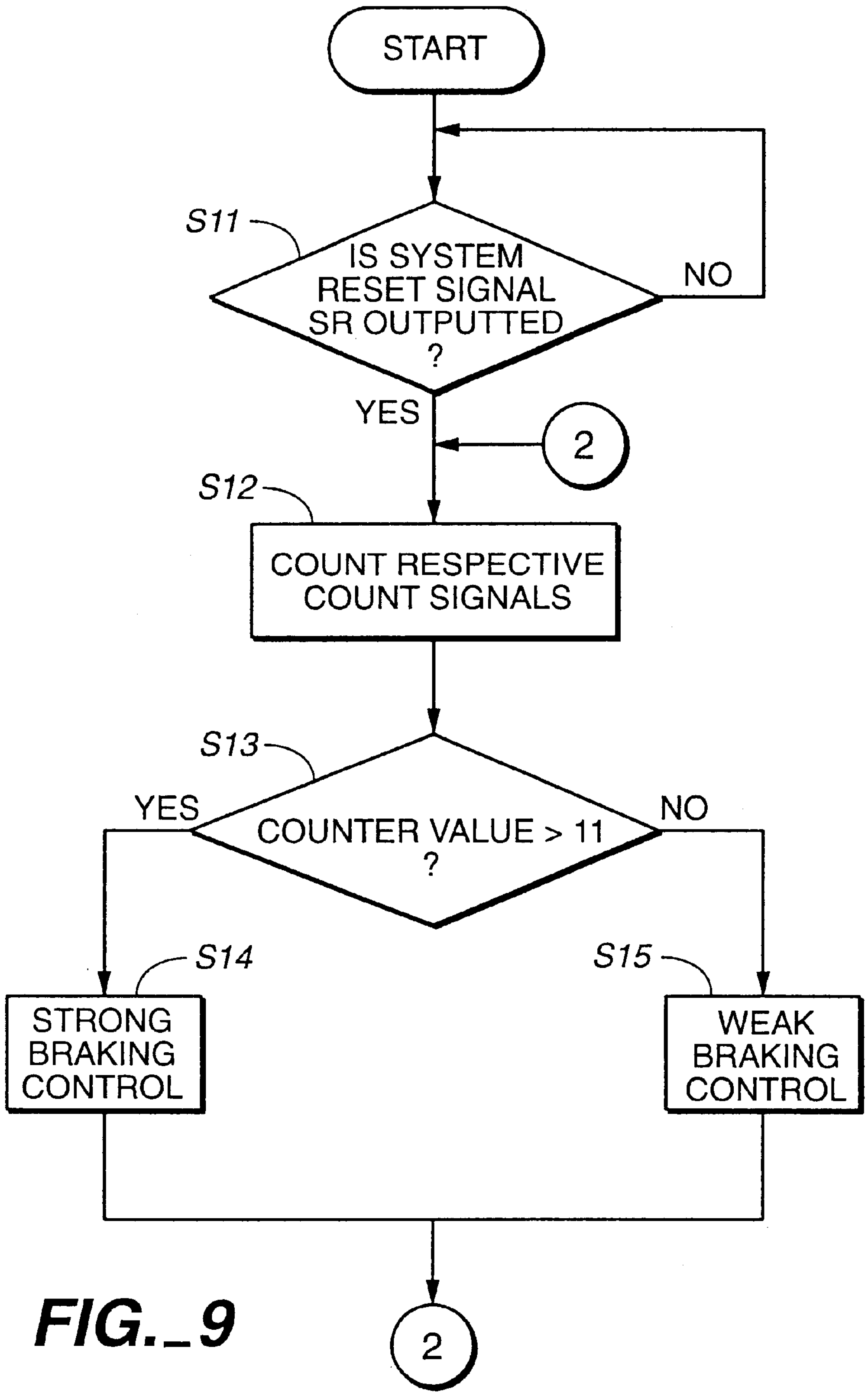
FIG. 9 is a flowchart illustrating a control method for the first embodiment.

Next, an operation of this embodiment will be described hereinbelow with reference to the timing charts of FIGS. 4, 5, 7, and 8, and the flowchart of FIG. 9.

Figure 4:
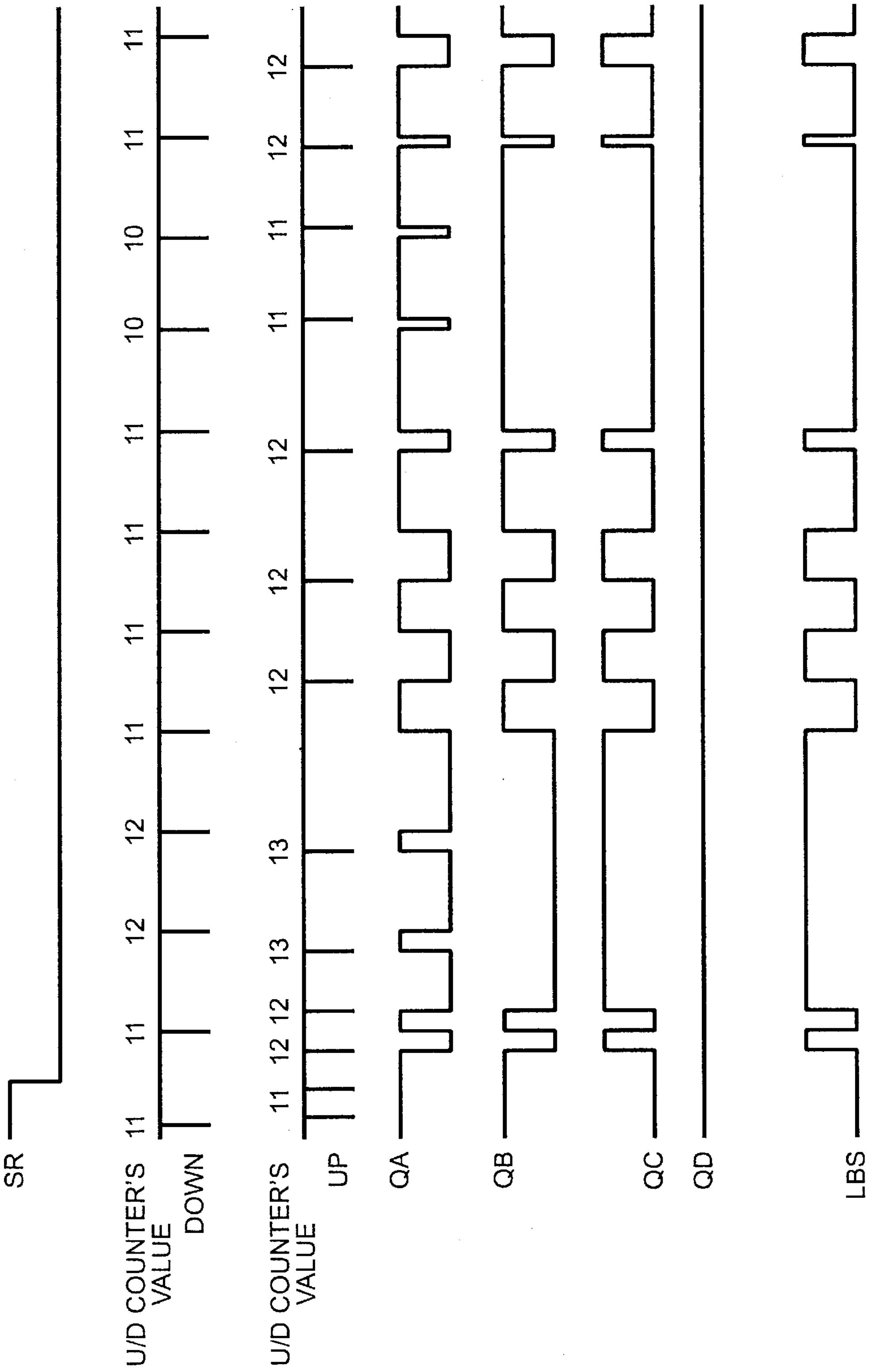
FIG. 4 is a timing chart illustrating an operation of the first embodiment.

When the generator 20 starts working, a system reset signal SR is inputted from the initializing circuit 91 to an input terminal LOAD of the up/down counter 54 (step S11). Then, as illustrated in FIG. 4, an up-counting signal based on the rotation detection signal FG1 and a down-counting signal based on the reference signal fs are counted in the up/down counter 54 (step S12). These signals are established by the synchronization circuit 70 in such a manner as not to simultaneously be inputted to the counter 54.

Thus, when an up-counting signal is inputted once the initial count value is set at "11", the counter value changes to "12". The output signal LBS is changed in such a way as to have an H level, and is then outputted to the AND gate 88 of the chopping signal generating portion 80.

On the other hand, when a down-counting signal is inputted thereto and the count value becomes "11" again, the output signal LBS comes to have an L level.

The chopping signal generating portion 80 utilizes the output signals Q5 to Q8 and causes the first chopping signal generator 81 to output the output signal CH1, and also causes the second chopping signal generator 85 to output the output CH2, as illustrated in FIG. 5.

Further, in the case that a signal having an L level from the output terminal LBS of the up/down counter 54 (incidentally, the count value is equal to or less than "11"), an output signal CH3 of the NOR gate 89 is a chopping signal obtained by inverting an output signal CH1, namely, is a signal that has a relatively long part (that is, "a brake-off time"), during which the signal level is an H level, of the duration, and that has a relatively short part (that is, "a brake-on time"), during which the signal level is an L level, thereof, and that has a small duty ratio (that is, a ratio of a time period during which the switch 121 is on, to a time period during which the switch 122 is on. Therefore, the brake-on time in the reference cycle becomes short. Thus, almost no brake is applied to the generator 20. That is, what is called a weak braking control operation is performed (at steps S13 and S15) by giving preference to the generated power.

On the other hand, when a signal having an H level is outputted from the output terminal LBS of the up/down counter 54 (that is, the count value is equal to or greater than "12"), an output signal outputted from the AND gate 88 becomes an H level. Thus, the output signal CH3 outputted from the NOR gate 89 is a chopping signal obtained by inverting the output signal CH2, namely, is a signal that has a relatively long part (that is, "a brake-on time"), during which the signal level is an L level, of the duration, and that has a relatively short part (that is, "a brake-off time"), during which the signal level is an H level, thereof, and that has a large duty ratio. Therefore, the brake-on time in the reference cycle becomes long. Thus, what is called a strong braking control operation is performed. However, the brake is off at constant cycles, so that the chopping control operation is performed. Consequently, brake torque can be increased while simultaneously preventing reduction in the generated power (at steps S13 and S14).

Incidentally, as illustrated in FIGS. 7 and 8, the signal RYZ, whose signal level changes according to the hand moving mode and the rate measuring mode (namely, the hand adjusting mode), which are set by manipulating the crown, is inputted to the NOR gate 89. Thus, when the signal level of the RYZ is an L level, the output CH3 is outputted as it is. Conversely, when the signal level of the RYZ is an H level, other inputs are canceled. Consequently, the signal level of the output signal CH3 is maintained at an L level.

Therefore, during the hand moving time, the chopping signals P1 and P2 correspondingly to the output signal CH3 are outputted, as illustrated in FIG. 7. Therefore, the chopping control operation is performed on the switches 121 and 122. Furthermore, in the hand adjusting mode (namely, in the rate measuring mode), the signal level of the output signal CH3 is maintained at an L level. The signal levels of the output signals P1 and P2 are similarly maintained at an L level. Thus, the switches 121 and 122 are maintained in an on-state. Consequently, the generator 20 is maintained in a short braking state.

Further, when the signal level of the signal Q15 is changed from an H level to an L level, the signal levels of the output signals P1 and P2 are once made to be an L level, as illustrated in FIG. 7. Thus, the switches 121 and 122 are on, so that the short braking is applied to the generator 20. In this way, the second and fourth field effect transistors 127 and 129 are controlled by the brake control circuit 55, and simultaneously turned on. Thus, the short braking is applied onto the generator 20, with the result that the output terminals MG1 and MG2 of the generator 20 are at the same potential level. Therefore, electric potential, which is sufficiently high to the extent that the transistors 126 and 128 are turned on, is not applied to the gates of these transistors 128 and 126. Consequently, both the first and third transistors 126 and 128 are turned off.

Thereafter, the signal levels of the signals P2 and P3 change to an H level. Then, the switch 121 is turned off, while the third switch 130 is turned on. Further, after the predetermined time (for example, about 1 msec) elapses, the switch 130 is turned off. Furthermore, the switch 122 is turned off.

On the other hand, in the hand adjusting mode (namely, in the rate measuring mode), the signal levels of the signals P1 and P2 are maintained at an L level. When the signal Q15 is changed from an H level to an L level, the signal levels of the output signals P1 and P2 still remain at an L level, and the switches 121 and 122 are turned on. Consequently, the timepiece maintains a state in which short braking is applied to the generator 20.

Thereafter, the signal levels of the signals P2 and P3 change to an H level, so that the switch 121 is turned off and the third switch 130 is turned on. Furthermore, after the lapse of the predetermined time (for example, about 1 msec), the switch 130 is turned off. Further, the switch 121 is turned on. The timepiece is returned to an initial state.

In either of the hand moving mode and the hand adjusting mode, during which the switch 130 is turned on and the switch 121 is turned off, electric current flows through a path from the capacitor 22, through the second input terminal 22*b*, the third switch 130, the first output terminal MG1, the coil of the generator 20, the second output terminal MG2, the second switch 122, to the first input terminal 22*a*. The electric current causes a magnetic change in the generator 20. The rate measuring device has a magnetic sensor, such as a Hall element, for generating a pulse signal based on a change in a magnetic field, and performs rate measurement by detecting rate measuring pulses outputted from the magnetic sensor owing to a change in the magnetic field of the generator 20, and checking output intervals.

Incidentally, the voltage doubler rectifier circuit (namely, the simplified synchronous boost chopping rectifier circuit) 21 changes the charge generated in the generator 20 in the capacitor 22 during the hand moving time in the following manner. That is, when the polarity at the first output terminal MG1 is negative (−) and the polarity at the second output terminal MG2 is positive (+), the first field effect transistor (FET) 126 is turned on, and the third field effect transistor (FET) 128 is turned on. Thus, the charge generated in the generator 20 correspondingly to the induced voltage is charged into the capacitor 123 of, for example, 0.1 μF through a circuit consisting of the second output terminal MG2, the capacitor 123, and the first output terminal MG1, and is into the capacitor 22 of, for instance, 10 μF through a circuit consisting of the second output terminal MG2, the second switch 122, the first input terminal 22*a*, the capacitor 22, the second input terminal 22*b*, the diodes 124 and 125, and the first output terminal MG1.

On the other hand, when the polarity at the first output terminal MG1 is "+" and the polarity at the second output terminal MG2 is changed to "−", the first field effect transistor (FET) 126 is turned on, and the third field effect transistor (FET) 128 is turned off. Thus, the induced voltage generated in the generator 20 and the charging voltage of the capacitor 123 are charged into the capacitor 22 at a voltage applied thereto by a circuit consisting of "the capacitor 123→the second output terminal MG2→the generator 20→the first output terminal MG1→the switch 121→the first input terminal 22*a*→the capacitor 22→the second input terminal 22*b*→the diode 124→the capacitor 123" indicated in FIG. 2.

Figure 10:
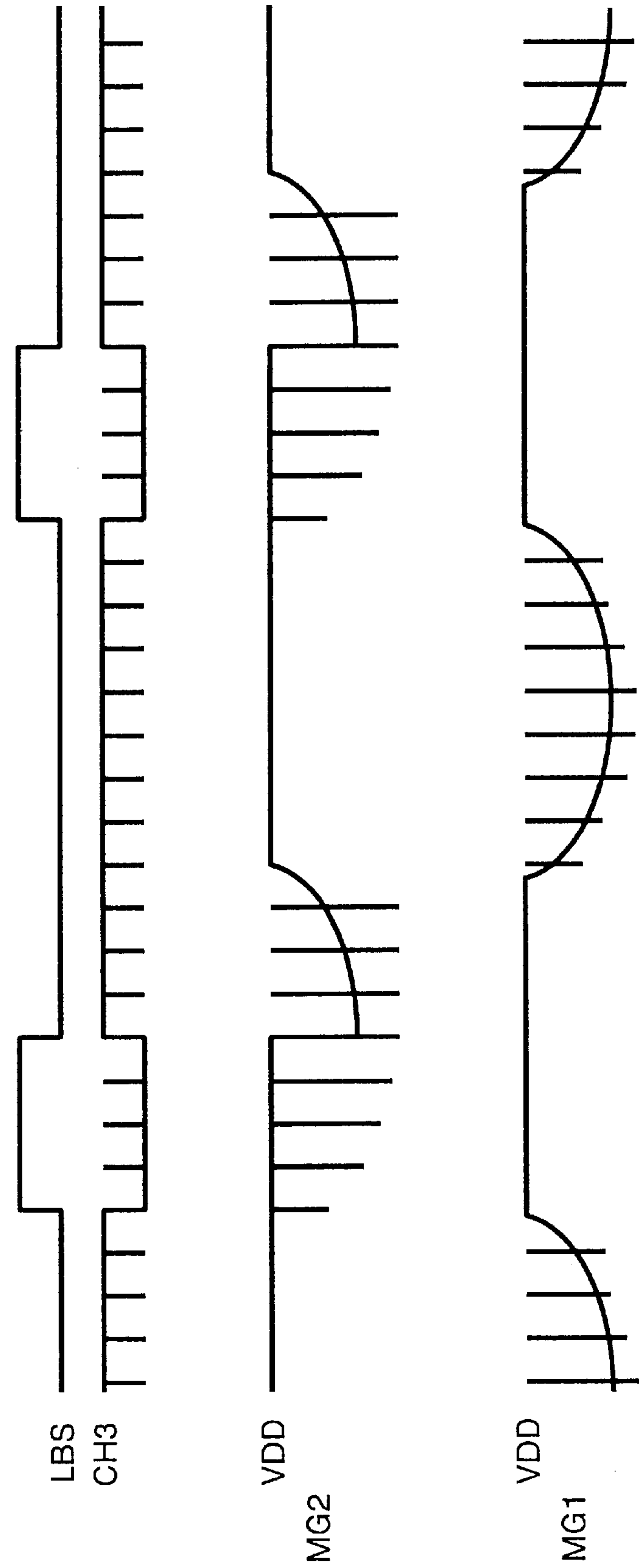
FIG. 10 is a waveform chart illustrating an AC signal in a circuit of the first embodiment.

Incidentally, when both terminals of the generator 20 are short-circuited (namely, a closed loop is formed) and then open-circuited in each state, a high voltage is induced across the coil, as illustrated in FIG. 10. The charging efficiency is improved by charging the power supply circuit (or capacitor) 22 at a high charging voltage.

Further, when the torque of the spring is large and the rotational speed of the generator 20 is high, an additional up-counting signal may be inputted after the count value is increased to "12" by the up-counting signal. In this case, the count value is "13". The signal level of the output signal LBS is maintained at an H level. Thus, the timepiece performs a strong braking control operation in which braking is applied on the generator 20 and becomes off at constant cycles according to the chopping signal CH3. Further, as a result of applying the braking thereon, the rotational speed of the generator 20 is lowered. When the reference signal fs (namely, the down-counting signal) is inputted twice before a rotation detection signal FG1 is inputted, the count value is lowered to "11" through "12". When the count value reaches "11", the strong braking control operation is switched to the weak braking control operation in which the brake is canceled.

When such control operations are performed, the rotational speed of the generator 20 becomes close to a set value. Then, as illustrated in FIG. 4, an up-counting signal and a down-counting signal are alternately inputted. Thus, the state of the timepiece is shifted into a locked state in which the count value is repeatedly and alternately switched between "11" and "12". At that time, the turning-on and turning-off of the brake are repeatedly performed according to the count value. That is, in one reference cycle, during which the rotor makes one revolution, a chopping signal, whose duty ratio is large, and another chopping signal, whose duty ratio is small, are applied to the switches 121 and 122. Thus, a chopping control operation is performed.

Further, when the spring 1*a* unwinds, so that the torque thereof becomes small, a time required to apply brake gradually decreases. The rotational speed of the generator 20 become close to a reference speed without applying brake thereto.

Then, even when brake is not applied thereto at all, the count values are frequently inputted. When the count value becomes equal to or less than "10", it is judged that the torque of the spring 1*a* is lowered. Thus, the movement of the hands is stopped. Alternatively, the speed of the movement of the hands is reduced to a very low value. Moreover, the timepiece sounds a buzzer, or lights a lamp and thus prompts a user to rewind the spring 1*a*.

Therefore, when a signal having an H level is outputted from the output terminal LBS of the up/down counter 54, a strong braking control operation is performed according to a chopping signal having a large duty ratio. When a signal having an L level is outputted from the output terminal LBS, a weak braking control operation is performed according to a chopping signal having a small duty ratio. That is, the up/down counter 54 switches between the strong braking control operation and the weak braking operation.

Incidentally, in this embodiment, in the case that the signal outputted from the output terminal LBS is an L-level signal, the H-level time period:the L-level time period=15:1. That is, the chopping signal CH3 has a duty ratio of (1/16)=0.0625. In the case that the signal outputted from the output terminal LBS is an H-level signal, the H-level time period:the L-level time period=1:15. That is, the chopping signal CH3 has a duty ratio of (15/16)=0.9375.

Further, as illustrated in FIG. 10, an AC signal having a waveform, which varies according to a change in the magnetic flux is outputted from each of the terminals MG1 and MG2 of the generator 20. At that time, chopping signals, which have constant frequency and differ in the duty ratio from one another, are suitably applied according to the signal outputted from the output terminal LBS to the switches 121 and 122. When a signal having an H level is outputted from the output terminal LBS, namely, when the strong braking control operation is performed, a short braking time in each chopping cycle is lengthened. Thus, a braking amount is increased, while the rotational speed of the generator 20 is decreased. Further, although the amount of generated power is lowered by applying a brake, a reduction in the amount of generated power at the time of the short braking is compensated by outputting energy, which is stored in the short braking time, when the switches 121 and 122 are turned off by chopping signals, thereby chopping the signal and boosting the voltage. Thus, braking torque can be increased by suppressing the reduction in the generated electric power.

Conversely, when a signal having an L level is outputted from the output terminal LBS, or when the weak braking control operation is performed, the short braking time in each chopping cycle is decreased. Thus, the braking amount is decreased, while the rotational speed of the generator 20 is increased. At that time, the chopping of the signal and the boosting of the voltage can be achieved when the switches 121 and 122 are turned off according to the chopping signal. Therefore, as compared with the case of performing the control operation without applying a brake, the power generation capability of the generator can be enhanced.

Furthermore, the AC output of the generator 20 is boosted and rectified by the voltage doubler rectifier circuit 21 and charged into the power supply circuit 22, which drives the rotation control device 50.

Incidentally, both of the output LBS of the up/down counter and the chopping signal CH3 utilize the outputs Q5–Q8, and Q12 of the frequency divider circuit 52. Namely, the frequency of the chopping signal CH3 is an integer multiple of the frequency of the output signal LBS. Thus, the generation of the chopping signal CH3 is performed in synchronization with a change in the output level of the output signal LBS, namely, with the switching between the strong braking control and the weak braking control operations.

Such an embodiment has the following effects.

(1) The coil of the generator 20 is used as the rate measuring coil. Thus, there is no need for providing an additional rate measuring coil separately from the coil of the generator. Consequently, the size and cost of the electronically controlled mechanical timepiece can be reduced by a commensurate amount.

(2) The turning-on and turning-off of the switches 121 and 122 are controlled according to the different signals P1 and P2 independent of each other. Moreover, the third switch 130 is provided between the first output terminal MG1 of the generator 20 and the second input terminal 22 of the capacitor 22. This switch 130 is controlled according to the signal P3 independent of the switches 121 and 122. Thus, electric charge can be fed in the coil of the generator 20 from the capacitor 22 by turning on the switches 122 and 130 and by turning off the switch 121. Thus, rate measuring pulses can be generated by feeding electric current from the capacitor 22 to the coil of the generator 20 at constant cycles (for instance, at 1-Hz cycles) for a predetermined time (for example, about 1 msec). The rate of the electronically controlled mechanical timepiece can be measured by detecting the rate-measuring-pulse generating (or outputting) intervals by means of the rate measuring device.

This rate measuring pulse is generated by the current flowing in the coil in a short time. That is, this pulse is a signal generated by an abrupt change in the electric current. Thus, this pulse can be easily distinguished from the chopping signal. Consequently, the rate measurement can be reliably achieved.

Furthermore, the rate measuring pulses are outputted at 1-second intervals. Thus, in the case that a light emitting diode (LED) adapted to blink at each detection of a rate measuring pulse is provided in the rate measuring device, a measurer can easily confirm that the rate measurement is performed.

(3) Further, in the rate measuring mode, the signal levels of the chopping signals CH3, namely, the signals P1 and P2 are maintained at an L level, and the braking control operation of the generator 20 is canceled by inputting the signal RYZ, which can be changed between the rate measuring mode and the hand moving mode, into the NOR gate 89. Thus, in the rate measuring mode, no chopping signals are outputted, with the result that only the rate measuring pulses are outputted. Consequently, the detection of a rate measuring pulse can be more reliably achieved by performing the rate measurement in the rate measuring mode (namely, in the hand adjusting mode). Therefore, the rate measurement can be easily and reliably attained.

Furthermore, even in the case that the rate measurement is performed for a long time, the generator 20 continues to work. It is, thus, possible to continue to charge the power supply circuit 22. Moreover, an operation of the rotation control device 50 can be maintained. Furthermore, the provision of the rate measuring mode enables the setting of the third switch 130 so that this switch is controlled only in the rate measuring mode, and so that only the speed governing control operation is performed in the hand moving mode. Thus, the speed governing control operation can be efficiently achieved. Moreover, the current consumption caused by closing the third switch 130 can be reduced.

(4) The time required to measure the rate by closing the third switch 130 is very short (about 1 msec). Thus, even when the chopping signal CH3 hinders the braking control operation, this does not affect the speed governing control operation. Therefore, even in the hand moving mode, the rate measurement can be achieved without problems.

(5) Moreover, even in the hand moving mode, the rate measurement can be achieved. Thus, the rate measurement can be performed by simultaneously rectifying, namely, charging. Even in the case that the rate measurement is performed for a long time, the speed-governing control operation can be reliably performed.

(6) Up-counting signals based on the rotation detection signal FG1, and down-counting signals based on the reference signal fs are inputted to the up/down counter 54. Then, the advance or delay in the phase of each of such signals is detected. Further, according to a result of a detection, the braking control operation in a reference cycle just after the detection is performed. Thus, even in the case that there is a short-term fluctuation in the rotational speed of the motor, the advance or delay in the indicated time, which is recognized for a long time, can be eliminated in the timepiece. Thus, a high-precision speed governing control operation is realized. Moreover, the time indicating accuracy can be enhanced.

(7) The voltage doubler rectifier circuit (namely, a simplified synchronous boost chopping rectifier circuit ) 21 performs a rectifying control operation by using the first and third field effect transistors 126 and 128, each of which has a gate connected to a corresponding one of the terminals MG1 and MG2. Thus, there is no necessity for using a comparator. Consequently, the configuration of the circuit can be simplified. Moreover, the number of components is simplified. Furthermore, the reduction in the charging efficiency can be prevented from being caused owing to the power consumption. Furthermore, the turning-on and turning-off of the field effect transistors 126 and 128 are controlled by utilizing the terminal voltages (at the output terminals MG1 and MG2) of the generator 20. Thus, the field effect transistors 126 and 128 can be controlled in synchronization with changes in the polarities at the terminals of the generator 20. Consequently, the rectifying efficiency thereof can be enhanced.

(8) The second and fourth field effect transistors 127 and 129, which undergo the chopping control operation, are connected in parallel with the transistors 126 and 128. Thus, the chopping control operations can be performed on the FETs independent of each other. Moreover, the configurations thereof can be simplified. Consequently, there is provided the voltage doubler rectifier circuit (namely, the simplified synchronous boost chopping rectifier circuit) 21, which has a simple configuration and which can perform a chopping rectification operation in synchronization with changes in the polarities at the terminals of the generator 20, and which can perform the chopping rectification by simultaneously boosting the voltage.

(9) The rectifier circuit 21 can perform boosting by chopping, in addition to the boosting using the capacitor 123. Thus, the DC output voltage of the rectifier circuit 21, namely, the charging voltage of the capacitor 22 can be enhanced. Consequently, the charging efficiency can be improved.

(10) After the change in the output signal Q15, the second and fourth field effect transistors 127 and 129 are simultaneously turned on. Thus, short braking is applied to the generator 20. Then, both the first and third transistors 126 and 128 are turned off. Subsequently, the fourth transistor 129 and the transistor 131 are turned on, so that the electric current is fed thereto. Thus, even when the first transistor 126 is turned on the output terminal MG2 at the time of occurrence of change of the output signal Q15, the first transistor can be reliably turned off. Thus, the on/off of the switches 121, 122, and 130 can be reliably controlled. Moreover, the rate measuring pulses can be reliably outputted.

(11) The use of the 4-bit up/down counter 54 enables the counting of 16 count values. Thus, when up-counting signals are successively inputted, the accumulated input values can be counted. In the set range, namely, in a range, in which the up-counting signals and the down-counting signals are successively inputted and the count value reaches "15" or "0", an accumulated error can be corrected. Therefore, even if the rotational speed of the generator 20 is considerably deviated from the reference speed, it takes time to bring the timepiece into a locked state, so that the accumulated error is reliably corrected and the rotation speed of the generator 20 can be set to the reference speed again, and that the accurate movement of the hands can be maintained for a long term.

(12) This embodiment is provided with an activation setting circuit 90. Thus, the embodiment is set so that at the time of activation of the generator 90, the brake control is not performed, namely, no brake is applied to the generator 20. Consequently, the charging of the capacitor 22 can be preferentially performed. Therefore, the rotation control device 50 to be driven by the capacitor 22 can be speedily and stably driven. Furthermore, the rotation control operation to be performed thence can be enhanced.

Figure 11:
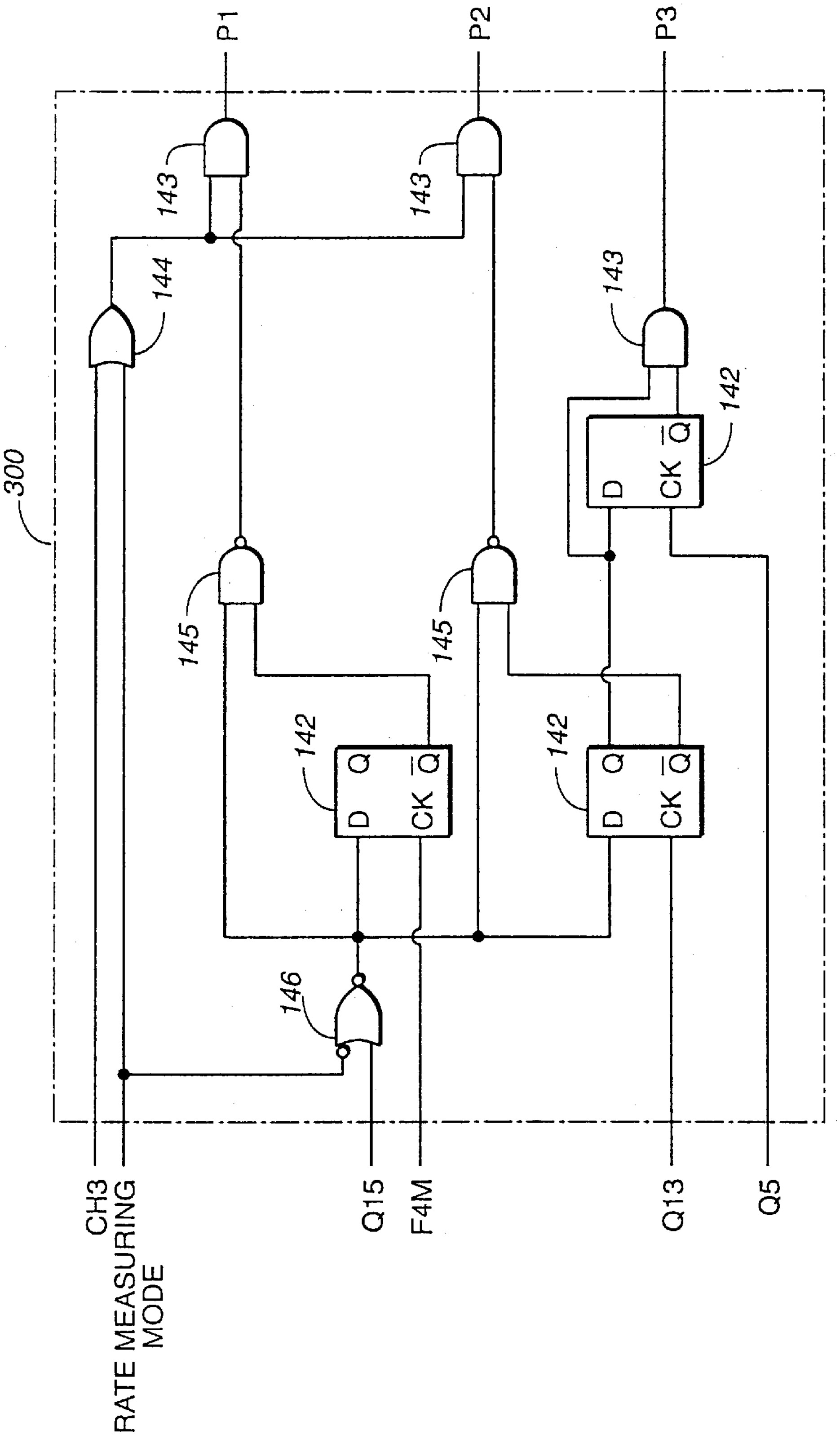
FIG. 11 is a circuit diagram illustrating the configuration of a switch control signal generating circuit of a second embodiment of the present invention.

Next, a second embodiment of the present invention will be described hereinbelow with reference to FIGS. 11 to 13. In the case of this embodiment, a switch control signal generating circuit 300 illustrated in FIG. 11 is used instead of the switch control signal generating circuit 140 of the first embodiment. This switch control signal generating circuit 300 is constituted by a combination of a NOR gate 146, flip-flops 142, AND gates 143, an OR gate 144, and NAND gates 145, similarly as the generating circuit 140 of the first embodiment.

An output signal CH3, output signals Q5 (1024 Hz), Q13 (4 Hz), Q15 (1 Hz), F4M (a 4-Hz delay signal) of the frequency divider circuit 52 are inputted to this switch control signal generating circuit 300. Further, the rate measuring mode signal (RYZ) is inputted thereto.

Figure 12:
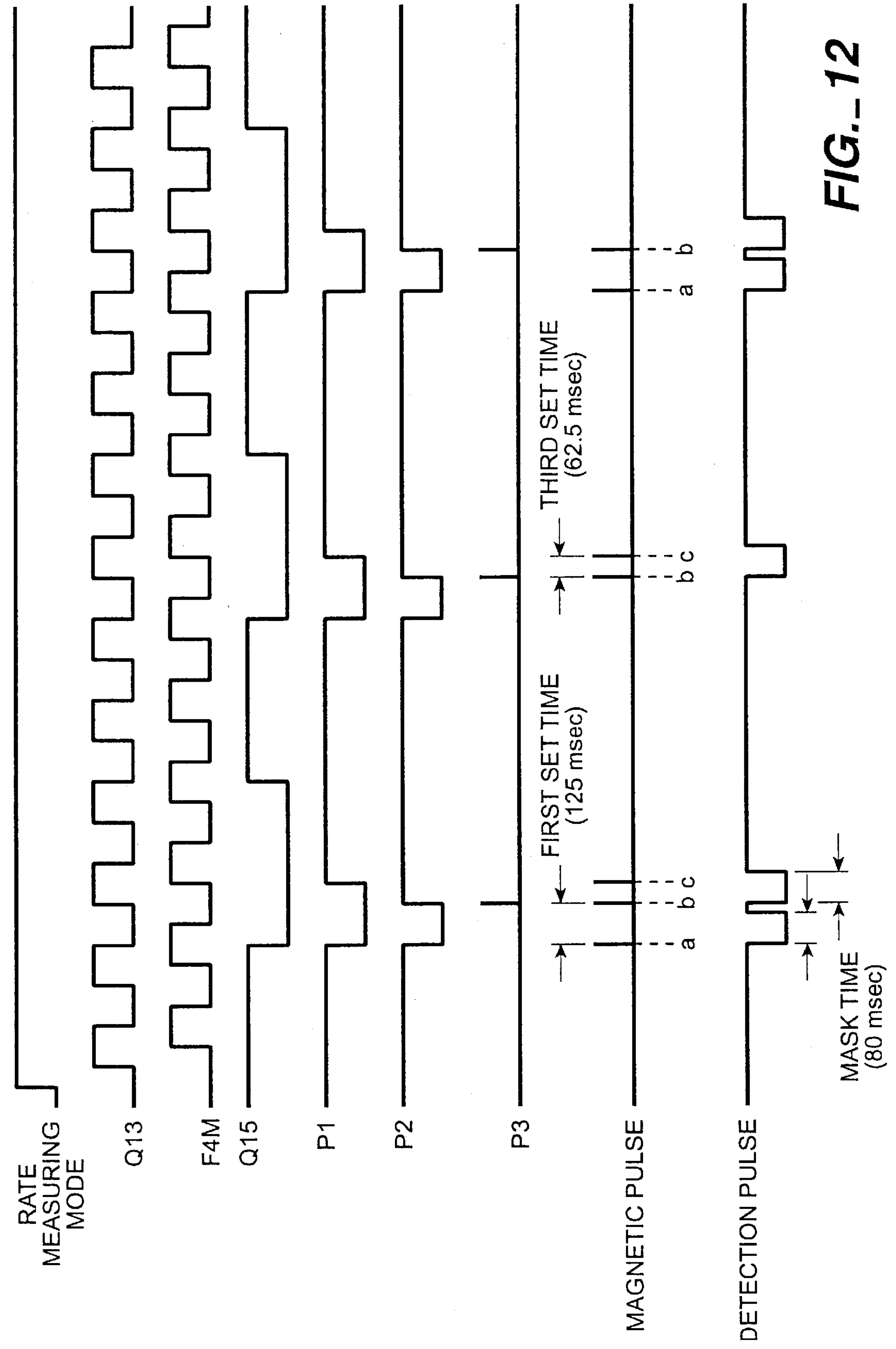
FIG. 12 is a timing chart illustrating an operation of the second embodiment in a rate measuring mode.

This switch control signal generating circuit 300 outputs signals P1, P2, and P3 according to the input signals, as illustrated in FIG. 12. The signal RYZ has an L level in the rate measuring mode. Thus, during the usual hand moving time, chopping pulse signals, which are the same as the output signal CH3, are outputted as output signals P1 and P2. A signal having an L level is outputted as the output signal P3. Namely, the rate measuring pulse is not outputted. Only a chopping brake operation is performed.

On the other hand, in the case that the mode is shifted to the rate measuring mode, when the signal level of the output signal Q15 changes from an H level to an L level as illustrated in FIG. 12, the signal levels of the output signals P1 and P2 change from an H level to an L level. Thus, the second and fourth transistors 127 and 129 of the switches 121 and 122 are turned on. Thus, short braking is applied to the generator 20 for a predetermined time, actually, for 125 msec, which is half the cycle of the signal Q13. Incidentally, when the signal levels of the output signals P1 and P2 change from an H level to an L level, the electromotive forces at the terminals MG1 and MG2 of the generator 20 are more than a predetermined value. When a change in the magnetic field, which can be detected by the rate measuring device, occurs, a magnetic pulse a is outputted from a magnetic sensor (namely, a Hall element) of the rate measuring device.

Then, the signal level of the output signal P2 changes from an L level to an H level after the predetermined time (that is, the first set time, which is 125 msec) elapses. Simultaneously, the signal level of the output signal P3 changes to an H level in an instant (that is, the second set time, which is about 1 msec). At that time, similarly as in the case of the first embodiment, the switch 130 is turned on, while the switch 121 is turned off. Thus, electric current flows through a path from the capacitor 22, the second input terminal 22*b*, the third switch 130, the first output terminal MG1, the coil of the generator 20, the second output terminal MG2, the second switch 122, and the first input terminal 22*a*. This current causes magnetic change in the generator 20. Then, the rate measuring device generates a magnetic pulse (that is, a rate measuring pulse).

Furthermore, when a predetermined time (that is, a third set time, which is 62.5 msec) elapses after the signal level of the output signal P2 changes to an H level, the signal level of the signal P1 changes to an H level. At that time, when an electromotive force, which is equal to or more than a certain value, is present at the terminal MG2 of the generator 20, a magnetic pulse c is generated in the rate measuring device.

The rate measuring device generates a detection pulse to be changed according to the input magnetic pulse signal. The rate measurement is performed by checking whether or not the detection pulse is outputted at constant cycles. At that time, to clarify a change in the signal level of the detection pulse, a mask time, whose duration is a predetermined value (for example, 80 msec), is provided when a magnetic pulse is inputted. Further, the time interval between the magnetic pulses a and b is 125 msec and thus longer than the mask time. Thus, regardless of the presence or absence of the magnetic pulse a, a detection pulse (namely, a change in the signal level) corresponding to the magnetic pulse b can be generated.

On the other hand, the time interval between the magnetic pulses b and c is shorter than the mask time. Thus, even when the pulse c occurs, the moment of occurrence thereof is within the mask time. Therefore, there is no change in the signal level of a detection pulse based on the magnetic pulse c.

Thus, the signal level of the detection pulse is always changed (or the detection pulse is outputted) corresponding to the magnetic pulse b, which is generated without fail at 1-second intervals. On the other hand, when a magnetic pulse a is generated, a change in the signal level of the detection pulse is caused (namely, the changed detection pulse is outputted). However, sometimes, the magnetic pulse a is not generated. In such a case, needless to say, no change in the signal level of the detection signal is caused by the magnetic pulse a.

Moreover, the magnetic pulse c causes no change in the signal level of the detection pulse.

Figure 13:
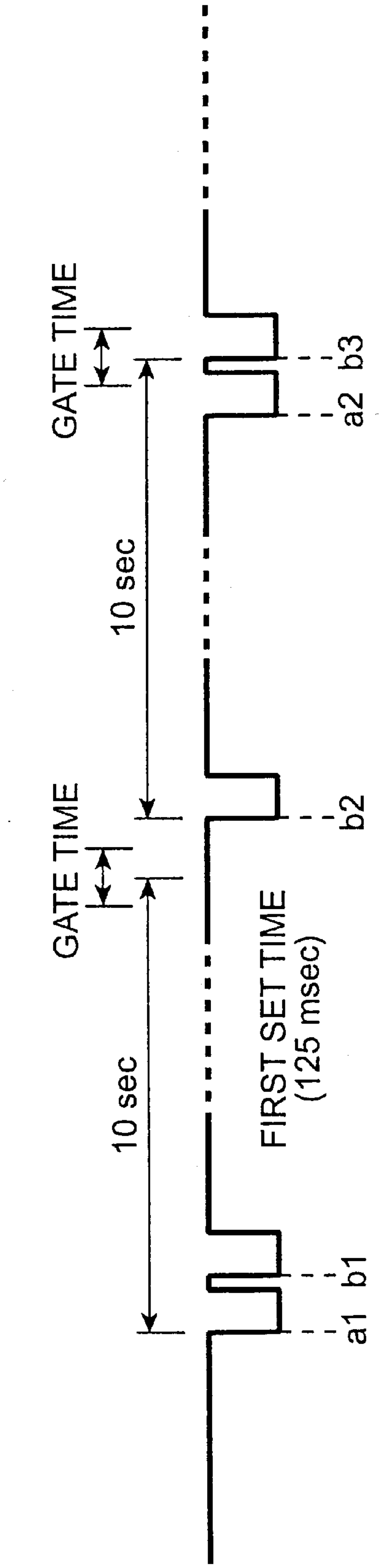
FIG. 13 is a timing chart illustrating a detection method in a rate measuring mode in the second embodiment.

Incidentally, as illustrated in FIG. 13, after a predetermined time, for example, 10 seconds elapses since a detection pulse is detected, the rate measuring device detects a detection pulse again. Practically, when triggered by the detection signal, the rate measuring device sets a gate period (or time) for accepting a signal, which period includes a moment, at which 10 seconds accurately elapses since triggered, and certain time periods existing before and after such a moment. If a signal is inputted in this gate time, the rate is indicated. Further, there is no input signal within this gate time, the next signal is regarded as a retrigger signal. That is, even when the measurement of 10 seconds is started since triggered by the first magnetic pulse a (corresponding to a point a1 of FIG. 13), a detection pulse cannot be detected if no magnetic pulse is generated when 10 seconds elapses since then. Thus, the retrigger is performed when the next magnetic pulse signal b (corresponding to a point b2) is detected. Thence, magnetic pulses b are always generated. Thus, the rate is measured at the point b3 ten seconds later. After that, the rate measurement is performed by using the point b as a start point.

Effects similar to those of the first embodiment can be obtained by using such a switch control signal generating circuit 300. The magnetic pulse output timing for the pulses a, b, and c is established by taking into consideration the mask time for detecting a pulse in the rate measuring device. Thus, the rate measurement can be reliably performed by utilizing the rate measuring pulse b.

Incidentally, the present invention is not limited to the aforementioned embodiments. The present invention includes modifications and improvements within a scope in which the object of the present invention is achieved.

Figure 14:
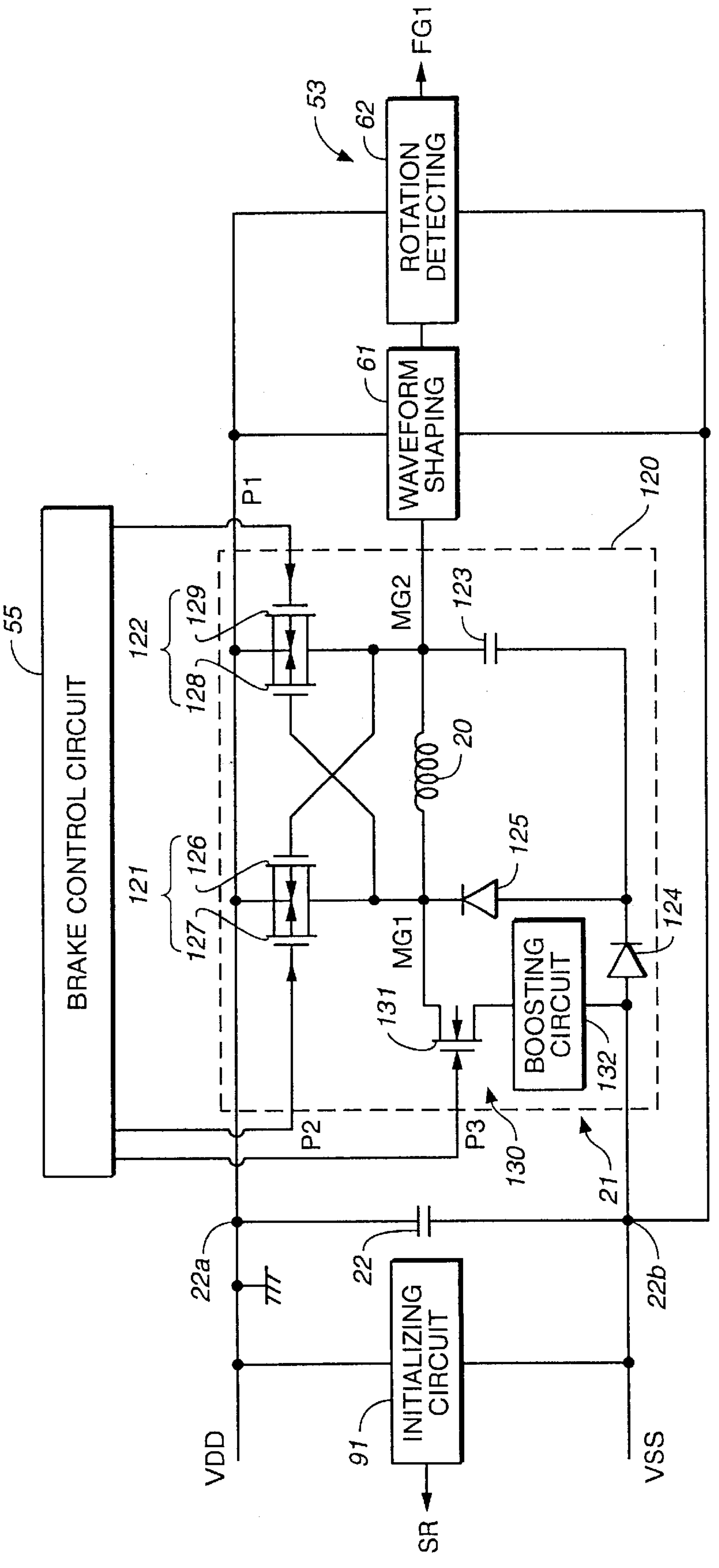
FIG. 14 is a circuit diagram illustrating the configuration of a modification of the present invention.

For example, as illustrated in FIG. 14, a boosting circuit 132 may be provided at the side of the gate of the transistor 131 of the switch 130. When the switch 130 is closed, electric current may be fed from the capacitor 22 to the coil of the generator 20 after boosted. The provision of such a boosting circuit 132 enables the setting of the signal level of the rate measuring pulse in such a manner as to be higher than that of the chopping signal. Even in the case that the rate measuring pulse are outputted together with the chopping signal, for instance, in the hand moving mode, the rate measuring device can be reliably and easily measured. Thus, the rate measurement can be more reliably achieved.

Moreover, the rotation control device 50 may have a rotation stopping device for mechanically stopping the rotation of the rotor of the generator 20. In the rate measuring mode, after the rotation of the rotor of the generator 20 is stopped by the rotation stopping device, the first switch 121 may be turned off. Further, the second switch 122 may be closed, while the third switch 130 may be closed for a predetermined time.

The provision of such a rotation stopping device enables the rate measurement by closing the third switch 130 in a state in which the rotation of the rotor is stopped. Thus, there is no need for the chopping control of the rotor, in the rate measuring mode. The timepiece may be configured so that only rate measuring pulses are outputted. The rate measurement can be performed.

Figure 15:
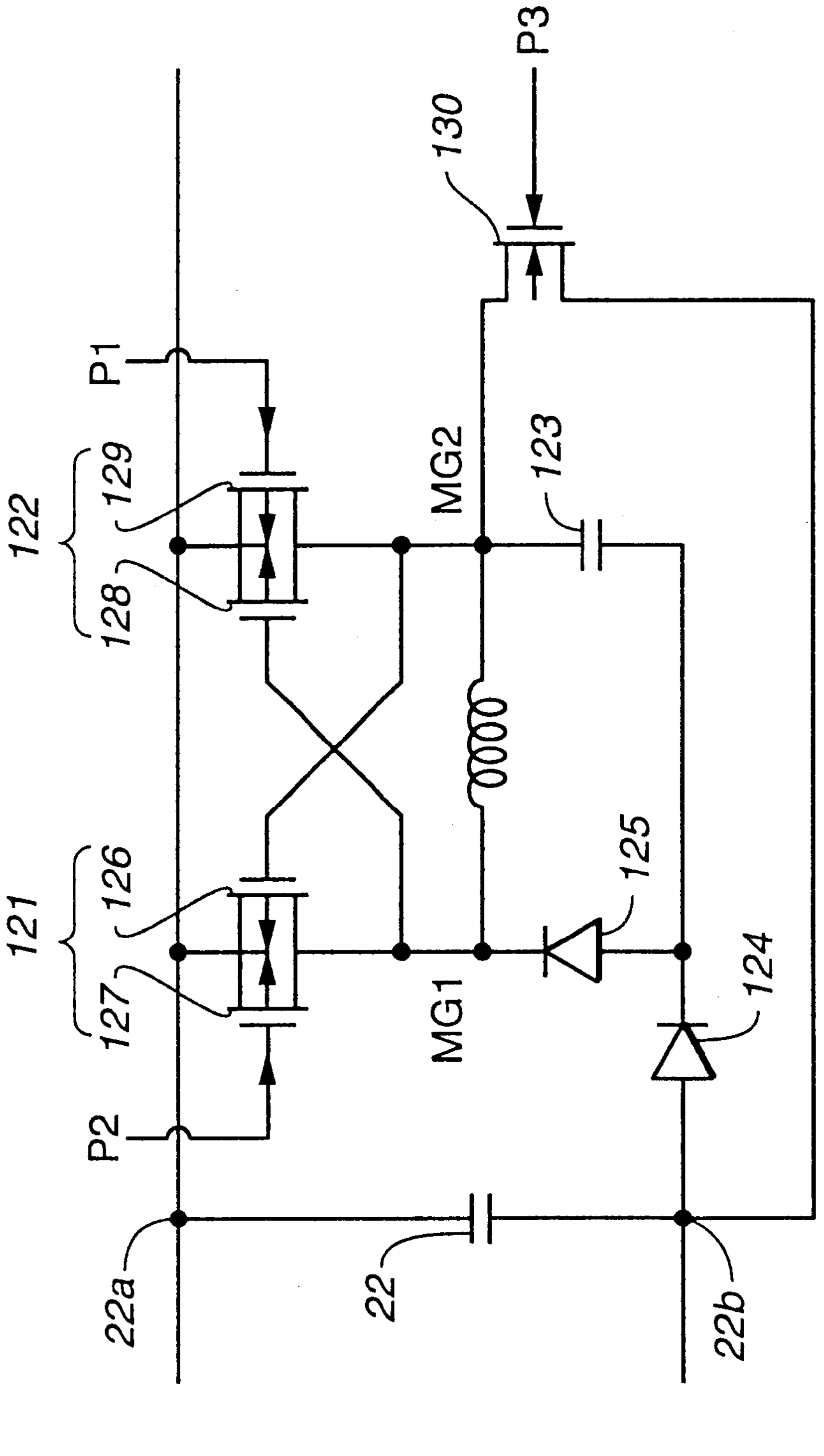
FIG. 15 is a circuit diagram illustrating the configuration of another modification of the present invention.

Further, in the aforementioned embodiments, the output terminals MG1 and MG2 are used as the first terminal and the second terminal, respectively. Conversely, as illustrated in FIG. 15, the output terminals MG2 and MG1 may be used as the second terminal and the first terminal, respectively. Moreover, the switch 121 and the switch 122 may be used as the second switch and the first switch, respectively. Furthermore, the third switch 130 may be disposed between the output terminal MG2 serving as the switch 122, and the second input terminal 22*b*. In short, it is sufficient that the first and second switches 121 and 122 of the present invention are adapted so that the rate measurement can be performed by feeding electric current from the capacitor 22, which serves as a power supply circuit, through the third switch 130 and the coil of the generator 20 when the third switch 130 is closed.

Moreover, in the aforementioned embodiments, the 4-bit up/down counter 54 is used as the counter. However, the up/down counters, the content of each of which is represented by 3 bits or less may be employed. Alternatively, the up/down counters, the content of each of which is represented by 5 bits or more may be employed. Furthermore, the counter is not limited to the up/down counter. First and second counters may be separately and respectively provided for the reference signal fs and the rotation detecting signal.

Furthermore, each of the switches 121 and 122 is not limited to the corresponding ones of the transistors 126, 127, 128, and 129, which are connected in parallel with one another. Additionally, the switches 121 and 122 may be constituted by those of other kinds. Incidentally, the aforementioned embodiments have advantages in that the switching control operation synchronized with the terminal voltages at the output terminals MG1 and MG2 of the generator 20, and the chopping control operation can be easily realized.

Furthermore, the third switch 130 may be constituted by switches of various kinds other than transistors. Further, although the Pch field effect transistors 126 to 129 are used as the switches 121 and 122, and the Nch field effect transistor 131 is used as the third switch 130, the Nch field effect transistors may be used as the switches 121 and 122, and a Pch field effect transistor may be used as the switch 130. The kinds of these transistors may be suitably set according to the outputs P1 to P3.

Furthermore, although the boosting capacitor 123 is provided in the rectifier circuit 21, this capacitor may be omitted. Components (such as the capacitor 123, the diodes 124 and 125) of the rectifier circuit 21 may be suitably provided as necessary.

Figure 16:
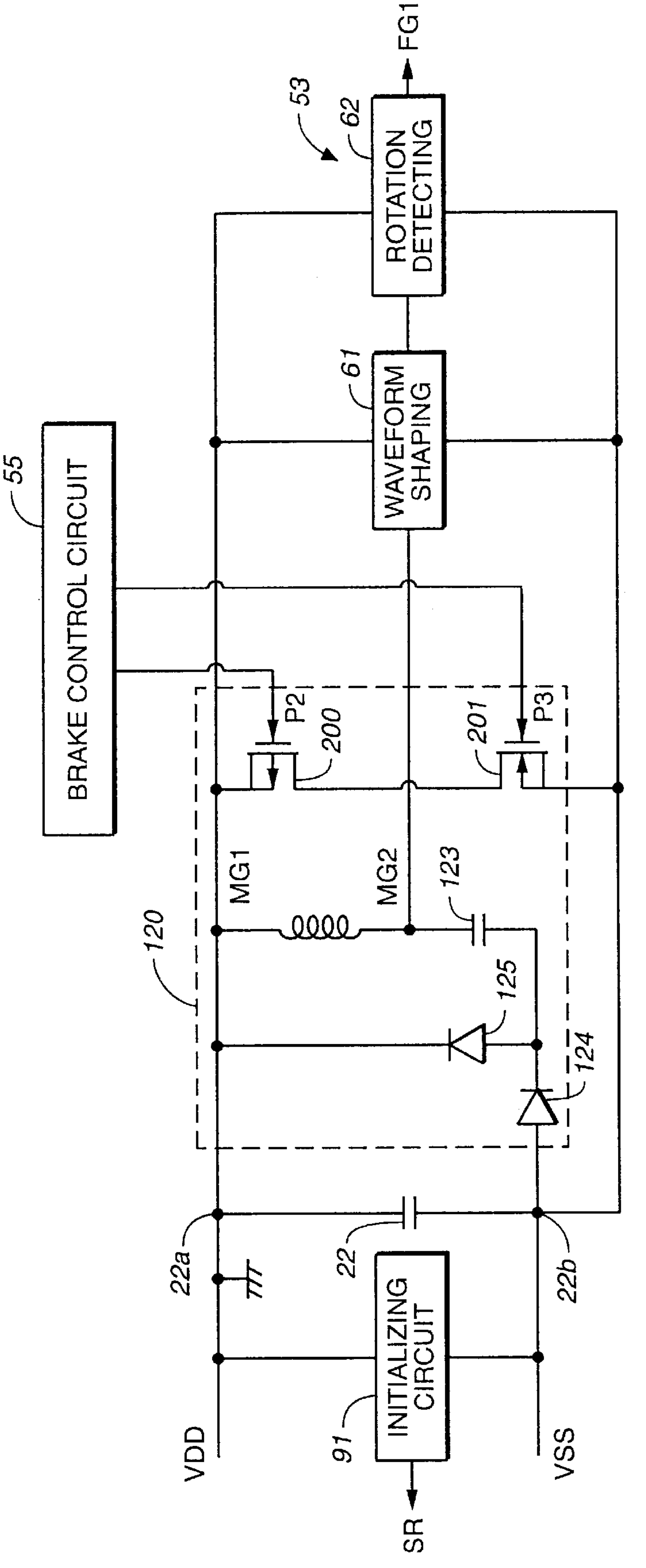
FIG. 16 is a circuit diagram illustrating the configuration of another modification of the present invention.

Further, in the aforementioned embodiments, the simplified synchronous boost chopping rectifier circuit is used as the rectifier circuit 21. However, as illustrated in FIG. 16, other rectifier circuits, such as a boost rectifier circuit having boosting capacitor 123 and diodes 124 and 125 may be used.

At that time, similarly as in the case of the aforementioned times, the brake control operation of the generator 20 is performed by turning on and off the switch 200, which is constituted by the transistors, according to the signal P2 sent from the brake control circuit 55, and establishing a closed loop and applying short braking thereto by short-circuiting the first output terminal MG1 and the second output terminal MG2.

Furthermore, the rate measurement can be performed as follows. That is, just after the switch 200 is first turned on by the signal P2 and then turned off, the switch 201 controlled by the signal P3 is turned on. Subsequently, electric current is fed from the capacitor 22, through the first output terminal MG1, the coil of the generator 20, the second output terminal MG2, and the switch 201. This electric current makes the generator 20 cause a magnetic change. Then, a rate measuring pulse is outputted. This signal is detected by the rate measuring device. Further, the output time intervals of this signal are checked. Thus, the rate measurement can be performed. Therefore, the signals P2 and P3 of the aforementioned embodiments can be used as those of the present invention.

Although the rate measuring mode is also used as the hand adjusting mode in the aforementioned embodiments, the rate measuring mode may be provided differently from the hand adjusting mode. For example, in the case of a watch adapted so that the hand adjusting mode is established by pulling out the crown, this watch may be so that the mode is shifted to the rate measuring device by pulling out and pushing in the crown a plurality of times or by pushing other buttons.

The electric current to be fed through the coil of the generator 20 at the time of the rate measurement is not limited to that supplied from the capacitor 20. A primary battery, such as a button type battery, and secondary battery charged by a solar cell may be provided separately from the capacitor 20, so that at the time of the rate measurement, electric current may be supplied from the primary and secondary battery.

Furthermore, the moment, at which electric current is fed for the rate measurement, is not limited to the time in which the rotation control operation of the generator 20 is stopped. The electric current may be fed therethrough during which the rotation control of the generator 20 is performed. In this case, regarding leakage flux from the coil, the magnetic flux caused by the rotation control operation is superposed onto the rate measuring magnetic flux, so that a decision may be made by distinguishing signals due to such magnetic flux. The aforementioned embodiments, in which the rotation control of the generator 20 is stopped by forcedly applying a brake thereon and then the current is fed through the coil, have the advantages in that the rate measuring signals can be reliably and easily detected.

Furthermore, the rate measuring method is not limited to the ordinary one using leakage flux. Methods of detecting change in a magnetic field, an electrical field, a sound, a voltage, or a current may be used. In short, any method utilizing the coil of the generator 20 may be used.

Further, regarding the measured deviation in rate (namely, a frequency error thereof), the oscillation frequency can be adjusted by ordinary rate adjustment methods, for example, a logical braking method for correcting an oscillation frequency error in a digital manner, and a capacitor braking method for correcting an oscillation frequency error in an analog manner by adjusting a capacitor of an oscillation circuit.

Furthermore, although the brake control operation is performed by inputting two kinds of chopping signal CH3 having different duty ratios to the switches 121 and 122 in the aforementioned embodiments, the brake control operation may be performed, without using the chopping signals, by, for example, inverting the signal LBS and then inputting the inverted signal to the switches 121 and 122. Further, although a closed loop is formed by short-circuiting the terminals MG1 and MG2 of the generator 20 and the brake control operation is performed by applying short braking thereto in the aforementioned embodiments, the brake control operation may be performed by connecting variable resistance to the generator 20 to thereby change a current value of electric current flowing through the coil of the generator 20. In short, the practical configuration of the brake control circuit 55 is not limited to that of the brake control circuit of the aforementioned embodiments, and may be suitably set according to the employed brake method.

Additionally, the mechanical energy source for driving the generator 20 is not limited to the spring 1*a*. Rubber, a spring, a weight, fluids, such as compressed air, may be employed as the mechanical energy source. That is, the mechanical energy source may be suitably set according to an object to which the present invention is applied. Furthermore, a hand-winding device, oscillating weights, potential energy, change in air pressure, wind forces, wave forces, hydropower, or a temperature difference may be employed as means for inputting mechanical energy to these mechanical energy sources.

Furthermore, the mechanical energy transmitting means for transmitting mechanical energy to the generator from the mechanical energy source, such as the spring, are not limited to the wheel (or gear) train 7. Frictional wheels, belt (such as a timing belt) and pulley assemblies, chains, sprocket wheels, rack and pinion assemblies, and cams may be used as the mechanical energy transmitting means. That is, the mechanical energy transmitting means may be suitably set according to the type of electronically controlled timepieces.

Further, the time indication means is not limited to the hands 13. Disk-like, ring-like, and arcuate means may be employed as the time indication means. Furthermore, a digital display time indication apparatus using a crystal liquid panel may be used as a time indication means.

INDUSTRIAL APPLICABILITY

As described above, according to the electronically controlled mechanical timepiece and the control method of the present invention, the coil of the generator is also used for rate measurement. Thus, the rate measurement can be performed in the electronically controlled mechanical timepiece. Moreover, the size of the timepiece can be reduced. Furthermore, the cost thereof can be decreased.

Additionally, the first to third switches are provided in the timepiece, and are controlled independent of one another. Thus, even in the case of the electronically controlled mechanical timepiece undergoing the chopping control operation, the rate measurement can be easily performed.

What is claimed is:

1. An electronically controlled mechanical timepiece having a mechanical energy source, a generator driven by said mechanical energy source for generating an induced electromotive force and supplying electrical energy, a power supply circuit into which the electrical energy is charged, and a rotation control device driven by said power supply circuit for controlling a rotation cycle of said generator, and a rate measuring coil or determining the accuracy of the timpiece, said rate measuring coil comprising a coil of said generator that receives electric current while said rotation control device stops controlling rotation of said generator.

2. The electronically controlled mechanical timepiece according to claim 1, wherein said rotation control device stops controlling rotation of said generator at constant cycles for a predetermined time, to thereby stop power generation by said generator for a predetermined time, during which rate measurement is performed by feeding electric current from said power supply circuit through said coil of said generator.

3. The electronically controlled mechanical timepiece according to claim 1, further comprising:

a first input terminal of said power supply circuit and a first output terminal of said generator and a first switch connected therebetween;

a second output terminal of said generator, and a second switch disposed between said first input terminal of said power supply circuit and said second output terminal of said generator;

a second input terminal of said power supply circuit, and a third switch disposed between said second input terminal of said power supply circuit and said first output terminal of said generator; and a brake control circuit that controls said switches independently of one another.

4. The electronically controlled mechanical timepiece according to claim 3, wherein said first switch comprises a first field effect transistor having a gate connected to said second output terminal of said generator, and a second field effect transistor connected in parallel with said first field effect transistor and adapted to be turned on and off by said brake control circuit, and wherein said second switch comprises a third field effect transistor having a gate connected to said first output terminal of said generator, and a fourth field effect transistor connected in parallel with said third field effect transistor and adapted to be turned on and off by said brake control circuit.

5. The electronically controlled mechanical timepiece according to claim 4, wherein said brake control circuit turns off said second transistor and turns on said third transistor for a predetermined time, at constant cycles, after establishing a closed loop among said output terminals of said generator by turning on said second and fourth transistors for a predetermined time.

6. The electronically controlled mechanical timepiece according to claim 4, wherein said brake control circuit switches between a rate measuring mode and a hand moving mode, and establishes a closed loop among said output terminals of said generator by turning on said second and fourth transistors for a predetermined time after canceling brake control applied to said generator by turning off said second and fourth field effect transistors for a predetermined time, and subsequently turns off said second transistor and closes said third switch for a predetermined time.

7. The electronically controlled mechanical timepiece according to claim 3, further comprising a boosting circuit connected to said third switch, and wherein when said third switch is closed, electric current boosted by said boosting circuit is supplied to said coil of said generator.

8. The electronically controlled mechanical timepiece according to claim 3, wherein said brake control circuit opens said first switch and closes said third switch for a predetermined time, at constant cycles, after establishing a closed loop among said output terminals of said generator by closing said first and second switches for a predetermined time.

9. The electronically controlled mechanical timepiece according to claim 8, wherein the predetermined time, during which said first and second switches are closed, is set to be longer than a mask time that is set when a magnetic pulse is inputted in a rate measuring device.

10. The electronically controlled mechanical timepiece according to claim 9, wherein the predetermined time is set to be equal to or longer than 70 msec and to be equal to or shorter than 200 msec.

11. The electronically controlled mechanical timepiece according to claim 10, wherein said rotation control device opens said second switch after a predetermined time, which is shorter than a mask time set when a magnetic pulse is inputted in said rate measuring device, elapses since said third switch is closed.

12. The electronically controlled mechanical timepiece according to claim 3, wherein said rotation control device comprises a rotation stopping device for mechanically stopping rotation of said generator, and wherein said brake control circuit switches between a rate measuring mode and a hand moving mode, and opens said first switch and closes said second switch and closes said third switch for a predetermined time, in a rate measuring mode, after said rotation stopping device stops rotation of said generator.

13. A method for controlling an electronically controlled mechanical timepiece having a mechanical energy source, a generator driven by said mechanical energy source for generating an induced electromotive force and supplying electrical energy, a power supply circuit into which the electrical energy is charged, and a rotation control device driven by the power supply circuit for controlling a rotation cycle of said generator, the method comprising: stopping controlling rotation of said generator, and performing rate measurement by feeding electric current through a coil of said generator at constant cycles.

14. The method for controlling an electronically controlled mechanical timepiece, according to claim 13, further comprising stopping controlling rotation of said generator at constant cycles, and wherein during the time when operation of controlling the rotation of said generator is stopped, rate measurement is performed by feeding electric current through said coil of said generator.

15. The method for controlling an electronically controlled mechanical timepiece, according to claim 13, wherein said timepiece further comprises a first switch disposed between a first input terminal of said power supply circuit and a first output terminal of said generator, a second switch disposed between said first input terminal of said power supply circuit and a second output terminal of said generator, and a third switch disposed between a second input terminal of said power supply circuit and said first output terminal of said generator, and a brake control circuit, and wherein said brake control circuit opens said first switch and closes said third switch for a predetermined time, at constant cycles, after establishing a closed loop among said output terminals of said generator by closing said first and second switches for a predetermined time.

16. The method for controlling an electronically controlled mechanical timepiece, according to claim 13, wherein said timepiece further comprises a first switch disposed between a first input terminal of said power supply circuit and a first output terminal of said generator, a second switch disposed between said first input terminal of said power supply circuit and a second output terminal of said generator, and a third switch disposed between a second input terminal of said power supply circuit and said output terminal of said generator, and a brake control circuit, and wherein said first switch comprises a first field effect transistor having a gate connected to said second output terminal of said generator, and a second field effect transistor connected in parallel with said first field effect transistor and adapted to be turned on and off by said brake control circuit, and wherein said second switch comprises a third field effect transistor having a gate connected to said first output terminal of said generator, and a fourth field effect transistor connected in parallel with said third field effect transistor and adapted to be turned on and off by said brake control circuit, and wherein said brake control circuit switches between a rate measuring mode and a hand moving mode, and establishes a closed loop among said output terminals of said generator by turning on said second and fourth field effect transistors for a predetermined time after canceling brake control applied to said generator by turning off said second and fourth field effect transistors for a predetermined time, and adapted to subsequently turn off said second field effect transistor and close said third switch for a predetermined time.

17. The method for controlling an electronically controlled mechanical timepiece, according to claim 13, wherein said timepiece further comprises a first switch disposed between a first input terminal of said power supply circuit and a first output terminal of said generator, a second switch disposed between said first input terminal of said power supply circuit and a second output terminal of said generator, a third switch disposed between a second input terminal of said power supply circuit and said output terminal of said generator, and a rotation stopping device for mechanically stopping rotation of said generator, and a brake control circuit, and wherein said brake control circuit switches between a rate measuring mode and a hand moving mode, and opens said first switch and closes said second and third switches for a predetermined time, in a rate measuring mode, at constant cycles after said rotation stopping device stops rotation of said generator.

* * * * *